(12) United States Patent
Murakami et al.

(10) Patent No.: US 10,050,299 B2
(45) Date of Patent: Aug. 14, 2018

(54) MANUFACTURING METHOD OF ELECTRIC STORAGE APPARATUS, AUXILIARY PLATE FOR ULTRASONIC WELDING, AND ELECTRIC STORAGE APPARATUS

(71) Applicant: GS Yuasa International Ltd., Kyoto-shi (JP)

(72) Inventors: Satoshi Murakami, Kyoto (JP); Shinsuke Yoshitake, Kyoto (JP); Tomonori Kishimoto, I, Kyoto (JP)

(73) Assignee: GS YUASA INTERNATIONAL LTD, Kyoto-Shi, Kyoto (JP)

( * ) Notice: Subject to any disclaimer, the term of this patent is extended or adjusted under 35 U.S.C. 154(b) by 618 days.

(21) Appl. No.: 14/418,889

(22) PCT Filed: Aug. 2, 2013

(86) PCT No.: PCT/JP2013/071036
§ 371 (c)(1),
(2) Date: Jan. 30, 2015

(87) PCT Pub. No.: WO2014/024802
PCT Pub. Date: Feb. 13, 2014

(65) Prior Publication Data
US 2015/0214568 A1   Jul. 30, 2015

(30) Foreign Application Priority Data

Aug. 9, 2012 (JP) .................................. 2012-177000

(51) Int. Cl.
*H01M 10/04* (2006.01)
*B23K 20/00* (2006.01)
(Continued)

(52) U.S. Cl.
CPC ........... *H01M 10/04* (2013.01); *B23K 20/002* (2013.01); *B23K 20/10* (2013.01); *B23K 20/106* (2013.01);
(Continued)

(58) Field of Classification Search
CPC .... B23K 20/002; B23K 20/106; B23K 20/24; B23K 20/10; B23K 2201/38;
(Continued)

(56) References Cited

U.S. PATENT DOCUMENTS

2002/0061438 A1   5/2002   Inoue et al.
2004/0028999 A1   2/2004   Richard et al.
(Continued)

FOREIGN PATENT DOCUMENTS

JP      10-50556 A       2/1998
JP      2000-164195 A    6/2000
(Continued)

OTHER PUBLICATIONS

English Translation of the International Preliminary Report on Patentability in PCT Application No. PCT/JP2013/071036 dated Feb. 19, 2015.
(Continued)

*Primary Examiner* — Ula C Ruddock
*Assistant Examiner* — Matthew W Van Oudenaren
(74) *Attorney, Agent, or Firm* — McGinn I.P. Law Group, PLLC

(57) ABSTRACT

A metal foil extending outward from electrode plates stacked in a layered manner is sandwiched between a first metal member provided with damping portions and a second metal member, and ultrasonic vibration is caused to act upon a plurality of sites of action from the first metal member side to join the metal foil to the first and second metal members. Each damping portion includes at least one of a cutaway
(Continued)

portion formed by cutting away part of the first metal member, a thick-walled portion formed by partially increasing the plate thickness of the first metal member, and a convex ridge portion formed by bending part of the first metal member into a convex ridge shape.

18 Claims, 18 Drawing Sheets

(51) Int. Cl.
| | | |
|---|---|---|
| *B23K 20/10* | (2006.01) | |
| *B23K 20/24* | (2006.01) | |
| *H01M 2/26* | (2006.01) | |
| *H01M 2/02* | (2006.01) | |
| *H01M 2/30* | (2006.01) | |
| *H01M 2/22* | (2006.01) | |
| *H01M 2/04* | (2006.01) | |
| *B23K 101/38* | (2006.01) | |
| *B23K 103/10* | (2006.01) | |
| *B23K 103/12* | (2006.01) | |
| *B23K 103/18* | (2006.01) | |

(52) U.S. Cl.
CPC ............. *B23K 20/24* (2013.01); *H01M 2/263* (2013.01); *H01M 10/0404* (2013.01); *B23K 2201/38* (2013.01); *B23K 2203/10* (2013.01); *B23K 2203/12* (2013.01); *B23K 2203/18* (2013.01); *H01M 2/0217* (2013.01); *H01M 2/04* (2013.01); *H01M 2/22* (2013.01); *H01M 2/26* (2013.01); *H01M 2/307* (2013.01); *H01M 10/0409* (2013.01)

(58) Field of Classification Search
CPC ............. H01M 10/04; H01M 10/0404; H01M 10/0409; H01M 2/263; H01M 2/22; H01M 2/26; H01M 2/0217; H01M 2/307; H01M 2/06; H01M 2/0404
See application file for complete search history.

(56) References Cited

U.S. PATENT DOCUMENTS

| | | |
|---|---|---|
| 2005/0118501 A1 | 6/2005 | Hashimoto et al. |
| 2007/0117009 A1 | 5/2007 | Yamauchi et al. |
| 2009/0064487 A1 | 3/2009 | Hashimoto et al. |
| 2009/0297940 A1 | 12/2009 | Nansaka et al. |
| 2011/0052976 A1 | 3/2011 | Ishii et al. |
| 2011/0195286 A1 | 8/2011 | Aota et al. |
| 2011/0223454 A1 | 9/2011 | Urano et al. |
| 2012/0070720 A1* | 3/2012 | Aizawa .................. B23K 20/10 429/163 |
| 2012/0088138 A1* | 4/2012 | Munenaga .......... H01M 2/0443 429/94 |
| 2012/0264007 A1 | 10/2012 | Sasaki et al. |
| 2012/0264008 A1 | 10/2012 | Okamoto et al. |
| 2013/0052531 A1 | 2/2013 | Yoshitake et al. |
| 2014/0030562 A1 | 1/2014 | Ishii et al. |

FOREIGN PATENT DOCUMENTS

| | | |
|---|---|---|
| JP | 2001-038475 A | 2/2001 |
| JP | 2003-197174 A | 7/2003 |
| JP | 2004-071199 A | 3/2004 |
| JP | 2005-183359 A | 7/2005 |
| JP | 2005-528741 A | 9/2005 |
| JP | 2007-149353 A | 6/2007 |
| JP | 2009-105074 A | 5/2009 |
| JP | 2009-289593 A | 12/2009 |
| JP | 2010-097764 A | 4/2010 |
| JP | 2010-097822 A | 4/2010 |
| JP | 2011-014276 A | 1/2011 |
| JP | 2011-049065 A | 3/2011 |
| JP | 2011-071109 A | 4/2011 |
| JP | 2011-165436 A | 8/2011 |
| JP | 2011-165437 A | 8/2011 |
| JP | 2011-192517 A | 9/2011 |
| JP | 2012-079427 A | 4/2012 |
| JP | 2012-160311 A | 8/2012 |
| JP | 2013-065552 A | 4/2013 |

OTHER PUBLICATIONS

International Search Report (ISR) (PCT Form PCT/ISA/210), in PCT/JP2013/071036, dated Sep. 3, 2013.

* cited by examiner

MANUFACTURING METHOD OF ELECTRIC STORAGE APPARATUS, AUXILIARY PLATE FOR ULTRASONIC WELDING, AND ELECTRIC STORAGE APPARATUS

CROSS-REFERENCE TO RELATED APPLICATION

This application claims priority to Japanese Patent Application No. 2012-177000, the disclosure of which is incorporated herein by reference in its entirety.

FIELD

The present invention relates to a method for manufacturing an electric storage apparatus by sandwiching a metal foil extending outward from electrode plates constituting an electrode assembly between a first metal member and a second metal member and causing ultrasonic vibration to act upon a plurality of sites of action from the first metal member side to join the metal foil to the metal members, an auxiliary plate for ultrasonic welding used in the course of the manufacturing, and an electric storage apparatus using the auxiliary plate.

BACKGROUND ART

In general, an electric storage element of an electric storage apparatus is composed of electrode plates stacked in a layered manner, in order to improve electricity storage efficiency. As the wiring configuration of this electric storage element, metal foils extending outward from respective electrode plates are bundled and joined directly or indirectly to wiring members in many cases.

In this case, ultrasonic welding technology is widely used as the above-described technique of joining metal foils.

The above-mentioned metal foils are ultrasonic-welded not simply by causing ultrasonic vibration to act upon the metal foils. Specifically, the method of ultrasonic welding is as follows. As described in Patent Literature 1 cited below, a metal member (first metal member) is sandwiched between a member (the leading end of a so-called horn) used to cause ultrasonic vibration to act upon the metal foil and the metal foil, and a metal member (second metal member) is also disposed on the opposite surface of the bundled portions of the metal foil. As described above, the bundled portions of the metal foil are sandwiched between the first metal member and the second metal member and, under that condition, ultrasonic vibration is caused to act upon the first metal member to join the metal foil to the metal members, thereby protecting the metal foil.

In addition, ultrasonic welding is performed in a plurality of places to secure a junction area, while avoiding an increase in the size of the leading end portion of the horn.

In the above-described conventional configuration, however, the metal member (first metal member) used to protect the metal foil may become damaged in some cases, as the result of ultrasonic welding being performed in a plurality of places.

That is, when ultrasonic vibration is caused to act upon the first metal member, the first metal member deforms in an undulating manner in the vicinity of each position for ultrasonic vibration to act upon. Thus, the above-mentioned deformations arising from both sides of adjacent positions become superimposed on each other between the two sites of action of ultrasonic vibration.

This superimposition of deformations on each other may in some cases result in such a degree of deformation as to produce cracks ascribable to the stress of the first metal member. If such cracks arise, the relative positional relationship between the first metal member and the metal foil shifts from a preferred positional relationship, thus leading to, for example, yield decline. Consequently, mass-productivity may degrade in some cases.

CITATION LIST

Patent Literature

Patent Literature 1: JP 2004-71199 A

SUMMARY

Technical Problem

An object of the present invention, which has been accomplished in view such circumstances, is to prevent damage to a metal member as much as possible, even when ultrasonic welding is performed in a plurality of places while protecting a metal foil to be welded with the metal member.

Solution to Problem

A method for manufacturing an electric storage apparatus according to the present invention includes the steps of: sandwiching a metal foil extending outward from electrode plates stacked in a layered manner between a first metal member provided with a damping portion and a second metal member; and causing ultrasonic vibration to act upon a plurality of sites of action from the first metal member side to join the metal foil to the first metal member and the second metal member, wherein in the step of joining the metal foil to the first and second metal members, each site of action is set to have the damping portion located between adjacent sites of action of ultrasonic vibration, and the damping portion includes at least one of a cutaway portion formed by cutting away part of the first metal member, a thick-walled portion formed by partially increasing the plate thickness of the first metal member, and a convex ridge portion formed by bending part of the first metal member into a convex ridge shape.

Here, one aspect of the method for manufacturing the electric storage apparatus according to the present invention may have a configuration, in which the damping portion includes a cutaway portion, and the cutaway portion extends from an end edge of the first metal member.

Another aspect of the method for manufacturing the electric storage apparatus according to the present invention may have a configuration, in which the damping portion includes a thick-walled portion, and in the first metal member, the thickness of the boundary between the thick-walled portion and a thin-walled portion surrounding the thick-walled portion is varied gradually.

Yet another aspect of the method for manufacturing the electric storage apparatus according to the present invention may have a configuration, in which the damping portion includes a convex ridge portion, and the convex ridge portion extends in a direction intersecting with a line connecting adjacent sites of action of ultrasonic vibration.

Still another aspect of the method for manufacturing the electric storage apparatus according to the present invention may have a configuration, in which end edges of the first metal member and the second metal member are coupled with each other at a joining section, and the cutaway portion is formed by cutting away a range of the first metal member from an end edge thereof up to at least the joining section.

Still another aspect of the method for manufacturing the electric storage apparatus according to the present invention may have a configuration, in which end edges of the first metal member and the second metal member are coupled with each other at a joining section and in the step of sandwiching the metal foil, the metal foil is sandwiched between the first metal member and the second metal member to have the end edge of the metal foil abutting on the joining section.

Still another aspect of the method for manufacturing the electric storage apparatus according to the present invention may have a configuration, in which the damping portion extends within a range from an end edge of the first metal member up to the position of a boundary of the first metal member with the joining section.

Still another aspect of the method for manufacturing the electric storage apparatus according to the present invention may have a configuration, in which the damping portion extends so as to surround part of a site of action.

An auxiliary plate for ultrasonic welding according to the present invention composed of a metal member including a contact-making surface to be placed against the welding surface of a foil-shaped object to be welded and an acting surface upon which ultrasonic vibration is caused to act and which is located on the opposite side of the contact-making surface is provided with a damping portion including at least one of a cutaway portion formed by cutting away part of the metal member, a thick-walled portion formed by partially increasing the plate thickness of the metal member, and a convex ridge portion formed by bending part of the metal member into a convex ridge shape.

Here, one aspect of the auxiliary plate for ultrasonic welding according to the present invention may have a configuration, in which the damping portion includes a cutaway portion, and the cutaway portion extends from an end edge of the metal member.

Another aspect of the auxiliary plate for ultrasonic welding according to the present invention may have a configuration, in which the damping portion includes a thick-walled portion and in the metal member, the thickness of the boundary between the thick-walled portion and a thin-walled portion surrounding the thick-walled portion is varied gradually.

Yet another aspect of the auxiliary plate for ultrasonic welding according to the present invention may have a configuration, in which the damping portion extends so as to surround part of a site of action.

An electric storage apparatus according to the present invention includes an electric storage element including an electrode assembly configured by stacking electrode plates, on one edge side of each of which a metal foil extends outward, in a layered manner; and any one of the above-described auxiliary plates for ultrasonic welding including a plurality of sites of action upon which ultrasonic vibration is caused to act and placed against the metal foil, wherein in the auxiliary plate, the damping portion is formed between adjacent ones of the sites of action.

DETAILED DESCRIPTION OF THE PREFERRED EMBODIMENT

Figure 1:
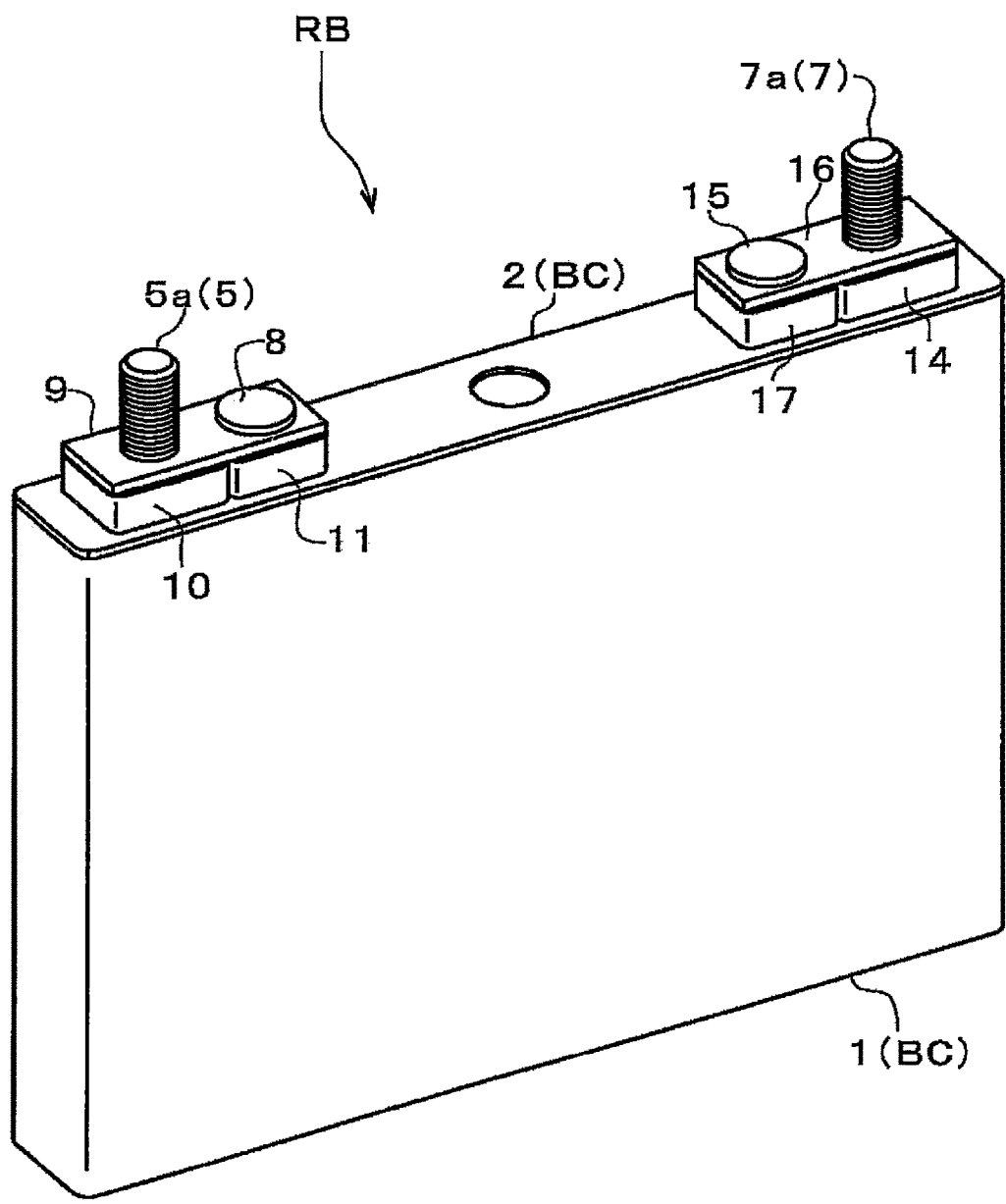
FIG. 1 is an external perspective view of an electric storage apparatus according to a first embodiment of the present invention.

A method for manufacturing an electric storage apparatus according to the present invention includes the steps of: sandwiching a metal foil extending outward from electrode plates stacked in a layered manner between a first metal member provided with a damping portion and a second metal member; and causing ultrasonic vibration to act upon a plurality of sites of action from the first metal member side to join the metal foil to the first metal member and the second metal member, wherein in the step of joining the metal foil to the first and second metal members, each site of action is set to have the damping portion located between adjacent sites of action of ultrasonic vibration, and the damping portion includes at least one of a cutaway portion formed by cutting away part of the first metal member, a thick-walled portion formed by partially increasing the plate thickness of the first metal member, and a convex ridge portion formed by bending part of the first metal member into a convex ridge shape.

According to such a configuration as described above, the damping portion is previously formed in a metal member (the above-mentioned first metal member) used to protect the metal foil to be welded, the metal foil is sandwiched between the first metal member and the second metal member at the time of ultrasonic welding work, and ultrasonic vibration is caused to act upon the metal foil from the first metal member side to join the metal foil to the first and second metal members.

These sites of action which ultrasonic vibration is caused to act upon are set to have the damping portion located between adjacent sites of action of ultrasonic vibration.

By setting welding positions in this way, the propagation of deformation is relieved or blocked off at a location where the damping portion is formed when the deformation of the first metal member caused by applying ultrasonic vibration propagates circumferentially from a site of action of ultrasonic vibration.

Consequently, deformations spreading from both sides between adjacent sites of action of ultrasonic vibration are prevented from becoming superimposed on each other.

Thus, according to the above-described configuration in which the first metal member is provided with the damping portion, the propagation of deformation in a metal member (the above-described first metal member) caused by applying ultrasonic vibration is relieved or blocked off at a location where the damping portion is formed, though the deformation spreads circumferentially from a site of action of ultrasonic vibration. This prevents deformations spreading from both sides between adjacent sites of action of ultrasonic vibration from becoming superimposed on each other. As a result, it is possible to prevent damage to a metal member as much as possible, even when ultrasonic welding is performed in a plurality of places while protecting a metal foil to be welded with the metal member.

Specifically, if the damping portion includes a cutaway portion, any mediums for propagating the deformation of the metal member are not present in the cutaway portion, and therefore, it is possible to block off the propagation of deformation. Accordingly, the propagation of deformation in the metal member due to the action of ultrasonic vibration can be blocked off at the cutaway portion.

If the damping portion includes a thick-walled portion, the rigidity of the first metal member is increased partially by partially increasing the plate thickness of the first metal member. Consequently, the thick-walled portion is not significantly deformed even if deformation caused by applied ultrasonic vibration reaches a location where the thick-walled portion is formed. Thus, it is possible to relieve the propagation of deformation.

If the damping portion includes a convex ridge portion and the convex ridge portion is formed in the first metal member, deformation energy is absorbed by the deformation of the convex ridge portion itself having large deformation margins, even if locations on both sides of the convex ridge portion are deformed due to the action of ultrasonic vibration. Consequently, the deformation energy is relieved as the energy transmits beyond the convex ridge portion. As a result, the propagation of deformation in a metal member due to the action of ultrasonic vibration can be relieved at the convex ridge portion.

One aspect of a method for manufacturing an electric storage apparatus may have a configuration, in which the damping portion includes a cutaway portion and the cutaway portion extends from an end edge of the first metal member.

According to such a configuration as described above, since the cutaway portion is formed so as to extend from an end edge of the first metal member, the configuration is significantly effective in blocking off deformation spreading circumferentially from a site of action of ultrasonic vibration. Consequently, it is possible to more effectively prevent damage to the metal member.

Furthermore, since the first metal member in which a plurality of sites of action of ultrasonic welding is set is still maintained as a single-piece member even if the cutaway portions are formed, it is possible to maintain the ease of handling the metal member used to protect the metal foil.

Another aspect of the method for manufacturing the electric storage apparatus may have a configuration, in which the damping portion includes a thick-walled portion, and in the first metal member, the thickness of the boundary between the thick-walled portion and a thin-walled portion surrounding the thick-walled portion is varied gradually.

If the boundary between the thick-walled portion and the thin-walled portion is formed into a stepped shape according to the difference in thickness therebetween, strong stress may act upon the stepped-shaped portion due to deformation spreading from a site of action of ultrasonic vibration, thus producing cracks therein.

Hence, by gradually varying the thickness of the first metal member in the boundary between the thick-walled portion and the thin-walled portion, it is possible to disperse deformation-induced stress spreading circumferentially from a site of action of ultrasonic vibration in the boundary. Consequently, it is possible to adequately protect the metal member (the above-mentioned first metal member).

Yet another embodiment of the method for manufacturing the electric storage apparatus may have a configuration, in which the damping portion includes a convex ridge portion, and the convex ridge portion extends in a direction intersecting with a line connecting adjacent sites of action of ultrasonic vibration.

According to such a configuration as described above, the propagation of deformation in the metal member due to the action of ultrasonic vibration can be securely relieved at the convex ridge portion.

Still another embodiment of the method for manufacturing the electric storage apparatus may have a configuration, in which end edges of the first metal member and the second metal member are coupled with each other at a joining section, and the cutaway portion is formed by cutting away a range of the first metal member from an end edge thereof up to at least the joining section.

According to such a configuration as described above, it is possible to extremely enhance the effect of blocking off the propagation of deformation at the cutaway portion, while ensuring the convenience of being able to handle the metal member as a single-piece member. Specifically, the configuration is as follows.

Each cutaway portion is formed by cutting away a wide range of the first metal member from an end edge thereof up to at least the joining section with the second metal member.

Accordingly, the first metal member is externally viewed, at first glance, as being divided into a plurality of members.

This signifies that the effect of blocking off deformation propagation is extremely large in the cutaway portion. Accordingly, deformation caused by applying ultrasonic vibration spreads only on the joining section side, and does not spread to the adjacent sites of action of ultrasonic vibration.

On the other hand, the first metal member is connected to the second metal member due to the presence of the joining section. Accordingly, metal members located on both sides of the metal foil to be welded can be treated as a single-piece member.

Note that for the above-described reason, the cutaway portion is more preferably formed so as to extend to the second metal member beyond the joining section.

Still another embodiment of the method for manufacturing the electric storage apparatus may have a configuration, in which end edges of the first metal member and the second metal member are coupled with each other at a joining section and in the step of sandwiching the metal foil, the metal foil is sandwiched between the first metal member and the second metal member to have the end edge of the metal foil abutting on the joining section.

According to such a configuration as described above, metal members located on both sides of the metal foil to be welded can be treated as a single-piece member. In addition, the metal foil to be welded, the first metal member and the second metal member can be positioned in place by utilizing the joining section. Specifically, the configuration is as follows.

Since the first metal member and the second metal member are connected by the joining section, metal members located on both sides of the metal foil to be welded can be treated as a single-piece member. In addition, the metal foil to be welded, the first metal member and the second metal member can be positioned in place by utilizing the joining section.

When the first metal member and the second metal member serving as a single-piece member are attached to the metal foil to be welded, the single-piece member and the metal foil can be positioned in place by arranging the leading end of the metal foil so as to be placed against the inner side of the joining section. As a result, it is easy to relatively position the metal foil, the first metal member and the second metal member in place and set positions for ultrasonic vibration to act upon.

Still another embodiment of the method for manufacturing the electric storage apparatus may have a configuration, in which the damping portion extends within a range from an end edge of the first metal member up to the position of a boundary of the first metal member with the joining section.

According to such a configuration as described above, the first metal member and the second metal member can be treated as a single-piece member, while securing a range of formation of the damping portion as much as possible.

That is, in the configuration in which the first metal member and the second metal member are connected at the joining section, the first metal member and the second metal member can be treated as a single-piece member, while securing a range of formation of the damping portion as much as possible, by limiting the range of formation of the damping portion up to the position of the boundary with the joining section.

Still another embodiment of the method for manufacturing the electric storage apparatus may have a configuration, in which the damping portion extends so as to surround part of the site of action.

According to such a configuration as described above, it is possible to more effectively block off the propagation of deformation in the first metal member spreading circumferentially from the site of action of ultrasonic vibration.

An auxiliary plate for ultrasonic welding according to the present invention composed of a metal member including a contact-making surface to be placed against the welding surface of a foil-shaped object to be welded and an acting surface upon which ultrasonic vibration is caused to act and which is located on the opposite side of the contact-making surface is provided with a damping portion including at least one of a cutaway portion formed by cutting away part of the metal member, a thick-walled portion formed by partially increasing the plate thickness of the metal member, and a convex ridge portion formed by bending part of the metal member into a convex ridge shape.

By performing ultrasonic welding using this auxiliary plate, deformations spreading from sites of action of ultrasonic vibration are prevented from becoming superimposed on each other.

That is, when ultrasonic welding is performed using this auxiliary plate, the propagation of deformation in the auxiliary plate caused by the action of ultrasonic vibration is relieved or blocked off at a location where the damping portion is formed, though the deformation spreads circumferentially from a site of action of ultrasonic vibration.

This prevents deformations spreading from sites of action of ultrasonic vibration from becoming superimposed on each other.

Specifically, if the damping portion includes a cutaway portion, any mediums for propagating the deformation of the metal member are not present in the cutaway portion, and therefore, it is possible to block off the propagation of deformation.

If the damping portion includes a thick-walled portion, the rigidity of the auxiliary plate is increased partially by partially increasing the plate thickness of the auxiliary plate. Consequently, the thick-walled portion is not significantly deformed even if deformation caused by applied ultrasonic vibration reaches a location where the thick-walled portion is formed. Thus, the propagation of deformation in the metal member due to the action of ultrasonic vibration can be relieved.

If the damping portion includes a convex ridge portion and the convex ridge portion bent into a convex ridge shape is formed in the first metal member, deformation energy is absorbed by the deformation of the convex ridge portion itself having large deformation margins, even if locations on both sides of the convex ridge portion are deformed due to the action of ultrasonic vibration. Consequently, the deformation can be prevented from propagating beyond the convex ridge portion. Accordingly, the propagation of deformation in a metal member due to the action of ultrasonic vibration can be relieved at the convex ridge portion.

One embodiment of the auxiliary plate for ultrasonic welding according to the present invention may have a configuration, in which the damping portion includes cutaway portions and the cutaway portions extend from an end edge of a metal member.

According to such a configuration as described above, since each cutaway portion is formed so as to extend from an end edge of the metal member, the configuration is significantly effective in blocking off deformation spreading circumferentially from a site of action of ultrasonic vibration. Consequently, it is possible to more effectively prevent damage to the auxiliary plate for ultrasonic welding.

Furthermore, since the metal member is still maintained as a single-piece member even if the cutaway portions are formed, it is possible to maintain the ease of handling the auxiliary plate.

Another embodiment of the auxiliary plate for ultrasonic welding according to the present invention may have a configuration, in which the damping portion includes a thick-walled portion and in the metal member, the thickness of the boundary between the thick-walled portion and a thin-walled portion surrounding the thick-walled portion is varied gradually.

According to such a configuration as described above, since the thickness of the boundary between the thick-walled portion and the thin-walled portion is gradually varied, it is possible to disperse deformation-induced stress spreading from a site of action of ultrasonic vibration. Consequently, it is possible to adequately protect the auxiliary plate.

Yet another embodiment of the auxiliary plate for ultrasonic welding according to the present invention may have a configuration, in which the damping portion extends so as to surround part of the site of action.

According to such a configuration as described above, it is possible to more effectively block off the propagation of deformation in the first metal member spreading circumferentially from the site of action of ultrasonic vibration.

An electric storage apparatus for ultrasonic welding according to the present invention is provided with an electrode assembly configured by stacking electrode plates, on one edge side of each of which a metal foil extends outward, in a layered manner; and an electric storage element including any one of the above-described auxiliary plates for ultrasonic welding including a plurality of sites of action upon which ultrasonic vibration is caused to act and placed against the metal foil, wherein in the auxiliary plate, the damping portion is formed between adjacent ones of the sites of action.

According to such a configuration as described above, damage to an auxiliary plate for ultrasonic welding used to protect the metal foils of the electrode assembly can be prevented when the metal foils are welded by means of ultrasonic welding. Thus, it is possible to improve the quality of the electric storage apparatus.

Hereinafter, embodiments of an electric storage apparatus to which the present invention is applied will be described with reference to the accompanying drawings.

<First Embodiment>

In the present first embodiment, a battery cell, particularly a nonaqueous electrolyte secondary cell (more specifically, a lithium-ion battery cell) which is one example of secondary battery cells will be cited and described as an example of an electric storage apparatus.

[Configuration of Secondary Battery Cell]

As shown in the perspective view of FIG. 1, a nonaqueous electrolyte secondary battery cell RB of the present first embodiment includes a cell housing BC (hereinafter simply referred to as "housing BC"). The housing BC includes a bottomed cylindrical (more specifically, bottomed rectangularly cylindrical) can body 1, and a cover part 2 overlaid on the open surface of the can body 1. The housing BC is configured by overlaying the cover part 2 on the open surface of the can body 1 and welding the cover part 2 thereto. The cover part 2 is formed from a reed-shaped rectangular plate material. A terminal bolt 5 which is the electrode terminal of a positive electrode and a terminal bolt 7 which is the electrode terminal of a negative electrode are fitted onto the surface of the cover part 2 on the outer side of the housing BC.

The can body 1 is a flattened rectangular parallelepiped conformable to the shape of the cover part 2. Accordingly, the housing BC as a whole has a flattened substantially rectangular parallelepiped shape.

Figure 2:
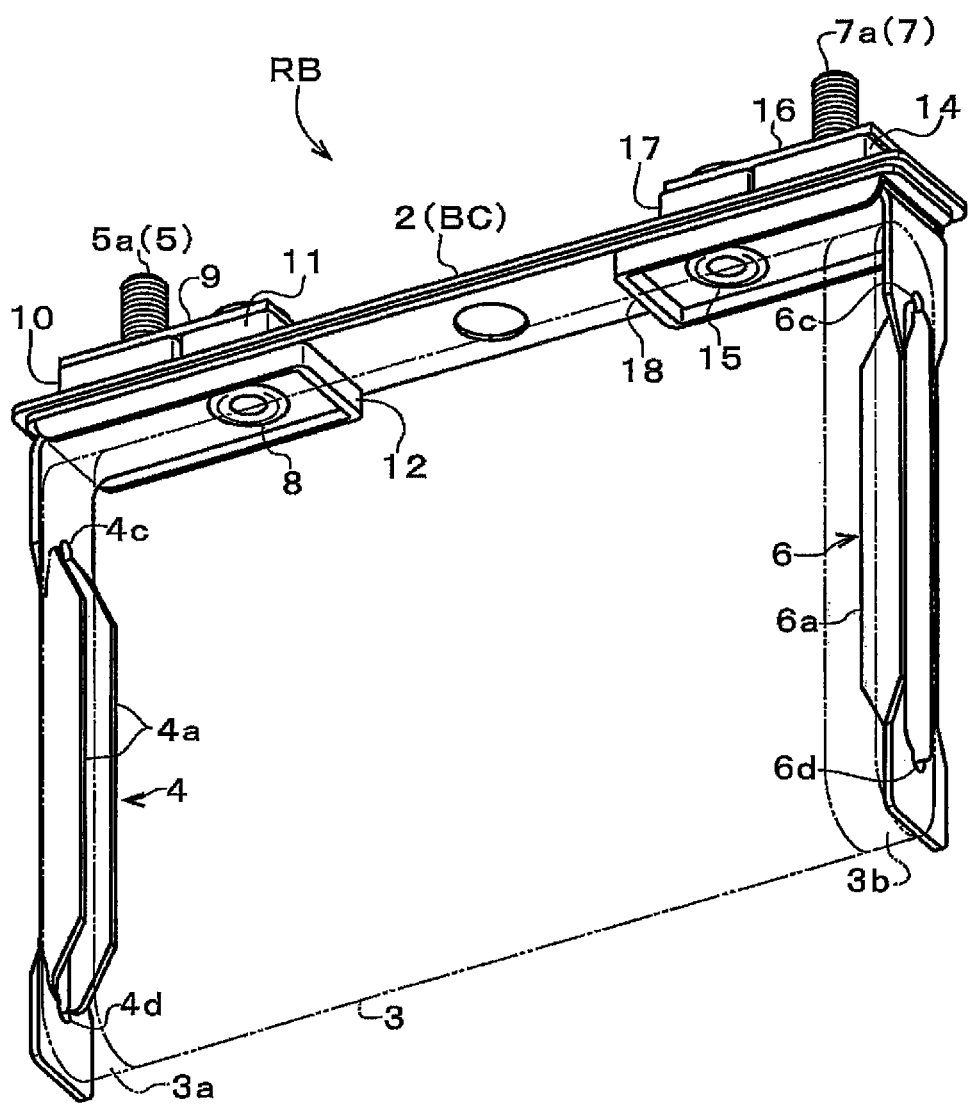
FIG. 2 is a perspective view showing the internal configuration of the electric storage apparatus according to the first embodiment of the present invention.

In FIG. 2, an electric storage element 3 and plate-shaped current collectors 4 and 6 schematically shown by double-dot chain lines are housed on the inner side of the housing BC. FIG. 2 is a perspective view of the inner side of the housing BC taken by looking up the housing BC from the lower side thereof with the can body 1 excluded.

The current collectors 4 and 6 are members used to electrically connect the electric storage element 3 and the terminal bolts 5 and 7.

Note that in the present first embodiment, the electric storage element 3 will hereinafter be referred to as "power generating element 3," since the secondary battery cell RB is cited as an example of the electric storage apparatus.

Both the current collector 4 and the current collector 6 are electrical conductors and have substantially the same shape. These current collectors 4 and 6 are disposed symmetrically. The materials of the current collector 4 and the current collector 6 differ from each other. The positive electrode-side current collector 4 is formed from aluminum, whereas the negative electrode-side current collector 6 is formed from copper.

The current collectors 4 and 6 are formed by bending plate-shaped members made from the above-mentioned metal materials into a predetermined shape. The current collectors 4 and 6 include a horizontally-positioned portion and a vertically-positioned portion and have a substantially L-shaped bent form in which these horizontally and vertically-positioned portions line up. The horizontally-positioned portion extends along the surface of the cover part 2 which is a surface where the terminal bolts 5 and 7 are disposed. The vertically-positioned portion bends 90° downward (to the opposite side of the surface on which the terminal bolts 5 and 7 are present) in the vicinity of the end portion of the cover part 2 in the longitudinal direction thereof, and extends in the normal-line direction of the surface of the cover part 2 on the inner side of the housing BC. Connecting portions 4a and 6a used to connect to the power generating element 3 are formed by bending parts of the vertically-positioned portions toward the power generating element 3 side. The connecting portions 4a and 6a are formed as described below. A pair of upper and lower through-holes 4c and 4d and a pair of upper and lower through-holes 6c and 6d are formed in the vertically-positioned portions of the current collectors 4 and 6 in a state of being flat plates. In addition, insections are formed between the through-holes 4c and 4d and between the through-holes 6c and 6d. Then, the insections are extruded by means of pressing or the like to form the connecting portions 4a and 6a.

The current collectors 4 and 6 have a narrow rectangular shape in conformity with the flattened shape of the housing BC. The current collectors 4 and 6 as a whole are bend-formed while being positioned along the side surface of the housing BC on the short side thereof.

The power generating element 3 is a so-called winding-type power generating element. The power generating element 3 is composed mainly of an electrode assembly. The electrode assembly includes a foil-shaped electrode plate serving as a positive electrode, a foil-shaped electrode plate serving as a negative electrode, and a long belt-shaped separator. The foil-shaped electrode plate serving as a positive electrode is formed by coating a long belt-shaped underlying metal foil formed from aluminum with a positive-electrode active material. The foil-shaped electrode plate serving as a negative electrode is formed by coating a long belt-shaped underlying metal foil formed from copper with a negative-electrode active material. The electrode assembly has a structure in which the separator is sandwiched between the foil-shaped electrode plate serving as a positive electrode and the foil-shaped electrode plate serving as a negative electrode, and these components are wound into a flattened shape in the longitudinal direction thereof, thereby stacking a pair of the foil-shaped electrode plate serving as a positive electrode and the foil-shaped electrode plate serving as a negative electrode in a layered manner.

The electrode assembly constituting this winding-type power generating element 3 is provided with uncoated parts 3a and 3b, in each of which the underlying metal foil is exposed on one width-direction lateral end thereof for electrical connection with the current collectors 4 and 6, in the foil-shaped electrode plates serving as positive and negative electrodes, respectively. The positive electrode-side uncoated part 3a and the negative electrode-side uncoated part 3b are located on the opposite side of each other across the widths thereof. In the state of being wound as described above, the positive electrode-side uncoated part 3a extends outward from one end side of the power generating element 3 in the winding axis direction thereof (width direction of the foil-shaped electrode plate). Likewise, the negative electrode-side uncoated part 3b extends outward from the other end side (opposite side of the uncoated part 3a) of the power generating element 3 in the winding axis thereof (width direction of the foil-shaped electrode plate).

The power generating element 3 and the current collectors 4 and 6 are joined as described below. Overlapped portions of the uncoated part 3a of the power generating element 3 which is the metal foil extending outward from the foil-shaped electrode plate serving as a positive electrode are bundled and joined together with the current collector 4 by means of ultrasonic welding. Likewise, overlapped portions of the uncoated part 3b of the power generating element 3 which is the metal foil extending outward from the foil-shaped electrode plate serving as a negative electrode are bundled and joined together with the current collector 6 by means of ultrasonic welding.

Note however that not only the above-described bundled portions of the metal foils and the current collectors 4 and 6 are ultrasonic-welded. The above-described bundled portions of the metal foils and the current collectors 4 and 6 are ultrasonic-welded using the auxiliary plates 21 for ultrasonic welding shown in FIG. 4 and FIG. 5.

These auxiliary plates 21 for ultrasonic welding will be discussed in detail in the later-described process for manufacturing the secondary battery cell RB.

As described above, the positive electrode-side terminal bolt 5 fitted on the cover part 2 made from metal (specifically, aluminum, for example) is electrically connected to the positive electrode-side current collector 4. In addition, the negative electrode-side terminal bolt 7 fitted on the cover part 2 made from metal is electrically connected to the negative electrode-side current collector 6.

The structure of attachment of the terminal bolt 5 to the cover part 2 and the structure of coupling of the terminal bolt 5 with the current collector 4 are substantially the same as the structure of attachment of the terminal bolt 7 to the cover part 2 and the structure of coupling of the terminal bolt 7 with the current collector 6. Thus, the terminal bolts 5 and 7 are disposed symmetrically. Hereinafter, a description will be made mainly of the positive electrode-side configuration.

Figure 3:
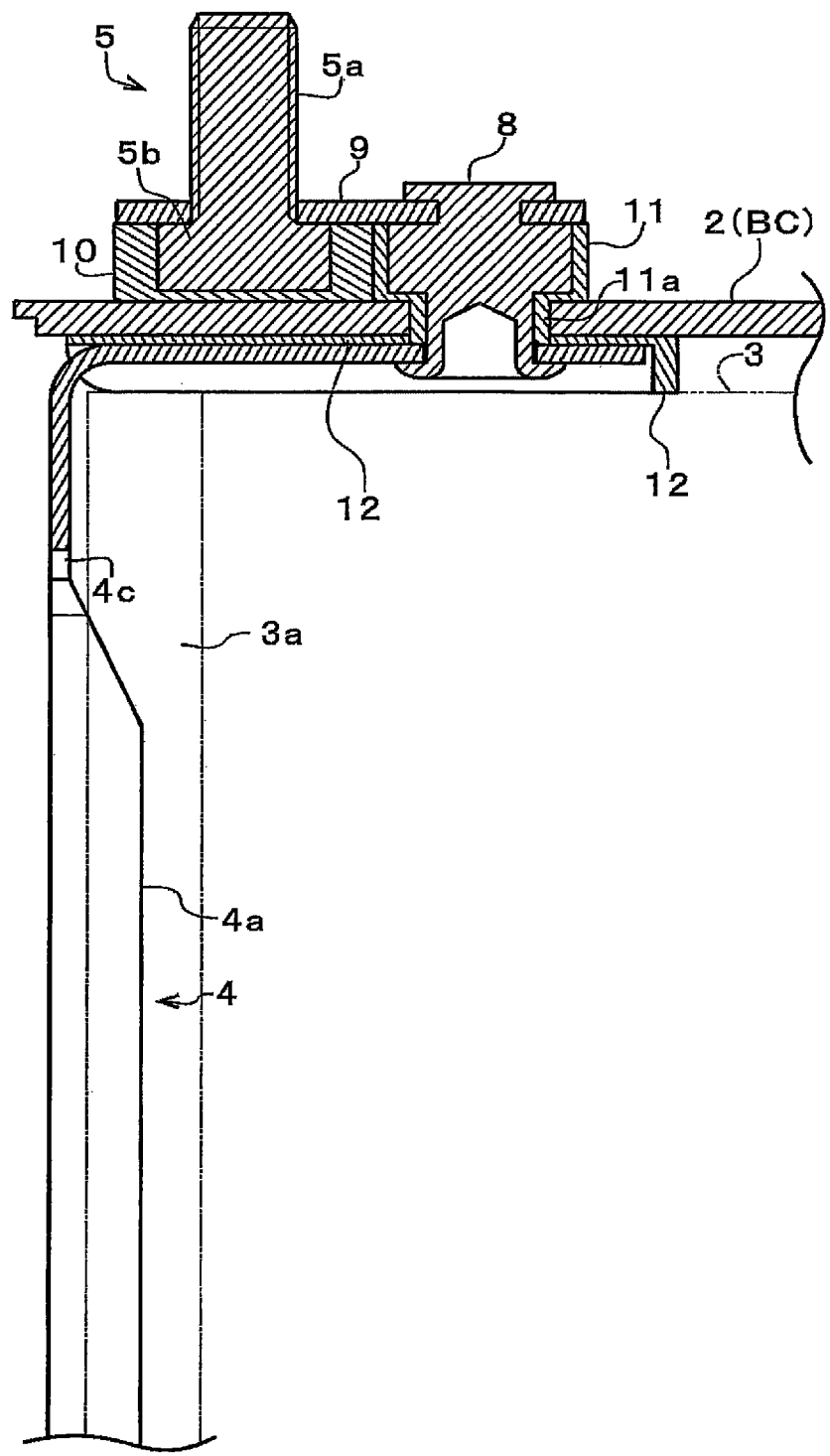
FIG. 3 is a cross-sectional view of a substantial part of the electric storage apparatus according to the first embodiment of the present invention.

As shown in the cross-sectional view of FIG. 3, the terminal bolt 5 is electrically connected to the current collector 4 through a rivet 8 and a metal plate 9. The rivet 8 is made from a metal material. More specifically, the positive electrode-side rivet 8 is made from aluminum like other positive electrode-side metal members. The metal plate 9 is made from, for example, nickel-plated copper.

The head of the rivet 8 fixes the metal plate 9 by tucking down the metal plate 9.

A retaining frame 10 is disposed on the cover part 2. The retaining frame 10 is open on the upper surface side thereof and includes a dish-shaped concave portion conformable to the shape of a head 5b of the terminal bolt 5 (rectangular shape in the example of the present embodiment). The head 5b of the terminal bolt 5 mates with the concave portion to prevent the terminal bolt 5 from rotation.

The retaining frame 10 is formed from resin which is an electrical insulating material to ensure electrical insulation between the terminal bolt 5 and the cover part 2.

In a current path from the current collector 4 to the terminal bolt 5, electrical insulation with respect to the cover part 2 is ensured by an upper gasket 11 and a lower gasket 12. In addition, the current path from the current collector 4 to the terminal bolt 5 is hermetically sealed up with the upper gasket 11 and the lower gasket 12 at a location of the cover part 2 where the rivet 8 penetrates therethrough. Both the upper gasket 11 and the lower gasket 12 are formed from an electrical insulating material (more specifically, resin) and serve as sealing members.

The upper gasket 11 has a structure in which a tubular part 11a to be fitted into an opening of the cover part 2 is attached to the bottom portion of a dish-shaped rectangular parallelepiped container open on the upper portion thereof. The upper gasket 11 holds the rivet 8 at a location thereof near the head with the dish-shaped rectangular parallelepiped container. In addition, the rivet 8 is fitted into the inner space of the tubular part 11a.

Under the condition of the terminal bolt 5 and the like being fitted on the cover part 2, the bottom portion of the upper gasket 11 is sandwiched between the head of the rivet 8 and the cover part 2.

Under the condition of the current collector 4 and the like being fitted on the cover part 2, the lower gasket 12 is sandwiched between the horizontally-positioned portion of the current collector 4 and the cover part 2.

The rivet 8 is swaged while being made to penetrate through the tubular part 11a of the upper gasket 11, the cover part 2, the lower gasket 12, and the horizontally-positioned portion of the current collector 4. Consequently, the rivet 8 fixes the horizontally-positioned portion of the current collector 4 on the cover part 2 and electrically connects the current collector 4 and the metal plate 9. As a result, the current collector 4 and the terminal bolt 5 are electrically connected to each other.

As shown in the perspective view of FIG. 2, the negative electrode-side configuration is symmetrical in arrangement with the positive electrode-side configuration across the center of the cover part 2. On the outer side of the housing BC, a retaining frame 14 disposed on the cover part 2 holds the head of the terminal bolt 7, and a metal plate 16 fixed on the rivet 15 electrically connects the rivet 15 and the terminal bolt 7.

The rivet 15 is swaged with the head thereof held on the upper gasket 17, while tucking down the upper gasket 17, the cover part 2, the lower gasket 18 and the current collector 6.

Like the current collector 6, the rivet 15 is made from copper and electrically connects the current collector 6 and the terminal bolt 7 through the metal plate 16.

[Manufacturing Process of Secondary Battery Cell RB]

Next, a process for manufacturing the secondary battery cell RB will be described with a focus on the assembly of the power generating element 3.

The foil-shaped electrode plate of the positive electrode is fabricated by, for example, coating and forming a positive-electrode active material layer of lithium iron phosphate or the like on both the front and back sides of a long belt-shaped aluminum underlying metal foil, and then performing press working or the like on the metal foil. As described above, an exposed area where the belt-shaped underlying metal layer is exposed without being coated with the positive-electrode active material is formed on one end in the width direction. This exposed area serves as the uncoated part 3a.

The foil-shaped electrode plate of the negative electrode is fabricated by, for example, coating and forming a negative-electrode active material layer of graphite or the like on both the front and back sides of a long belt-shaped copper underlying metal foil, and then performing press working or the like on the metal foil.

Also in the case of the foil-shaped electrode plate of the negative electrode, an exposed area where the belt-shaped underlying metal layer is exposed without being coated with the negative-electrode active material is formed on one end in the width direction. This exposed area serves as the uncoated part 3b.

The foil-shaped electrode plate of the positive electrode having a predetermined length and the foil-shaped electrode plate of the negative electrode having a predetermined length are wound around a flat plate-shaped winding axis with a separator sandwiched therebetween. At this time, the foil-shaped electrode plate of the positive electrode, the foil-shaped electrode plate of the negative electrode, and the separator are positioned in place, so that the uncoated part 3a protrudes to one side of the winding axis direction, whereas the uncoated part 3b protrudes to the other side of the winding axis direction.

In the power generating element 3, the separator is wound on the outermost circumference.

Figure 4:
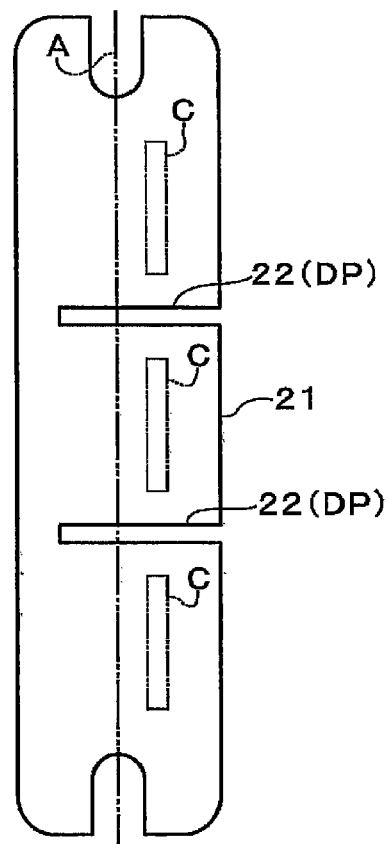
FIG. 4 is an enlarged view of an auxiliary plate for ultrasonic welding according to the first embodiment of the present invention in an unfolded state.
Figure 5:
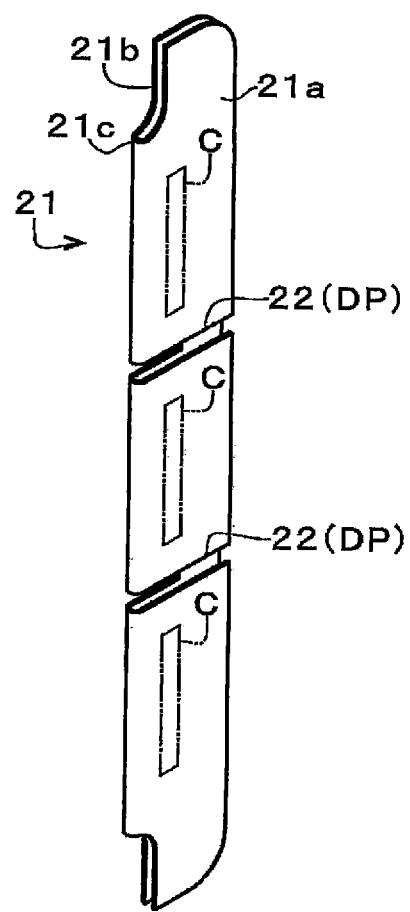
FIG. 5 is an enlarged perspective view of the auxiliary plate for ultrasonic welding according to the first embodiment of the present invention.

Next, as a preliminary arrangement for ultrasonic-welding the uncoated parts 3a and 3b and the connecting portions 4a and 6a of the current collectors 4 and 6, the auxiliary plates 21 for ultrasonic welding shown in FIG. 4 and FIG. 5 are attached to the uncoated parts 3a and 3b.

As shown in FIG. 5, each auxiliary plate 21 includes a pair of metal members 21a and 21b disposed oppositely to each other, and a joining section 21c for coupling end edges of this pair of metal members 21a and 21b with each other.

The respective auxiliary plates 21 sandwich the bundled portions of the uncoated parts 3a and 3b by the pair of metal members 21a and 21b and are thus attached to the uncoated parts 3a and 3b.

In the ultrasonic welding of the uncoated parts 3a and 3b and the like, ultrasonic vibration is caused to act upon the metal member 21a of the pair of metal members 21a and 21b thus attached.

For convenience of description, the metal member 21a of the pair of metal members 21a and 21b upon which ultrasonic vibration is caused to act is hereinafter referred to as "first metal member," whereas the other metal member 21b is referred to as "second metal member."

The auxiliary plate 21 attached to the positive electrode-side uncoated part 3a and the auxiliary plate 21 attached to the negative electrode-side uncoated part 3b are formed into almost the same shape. The auxiliary plate 21 attached to the positive electrode-side uncoated part 3a is made from aluminum. The auxiliary plate 21 attached to the negative electrode-side uncoated part 3b is made from copper.

The first metal member 21a, the second metal member 21b and the joining section 21c which are constituent elements of the auxiliary plate 21 are formed from a single thin plate-shaped metal member. The thin plate-shaped metal member is processed into the shape shown in FIG. 4. This processed member is then double-folded on a center line A shown in FIG. 4 to form the member into the shape shown in FIG. 5.

Figure 7:
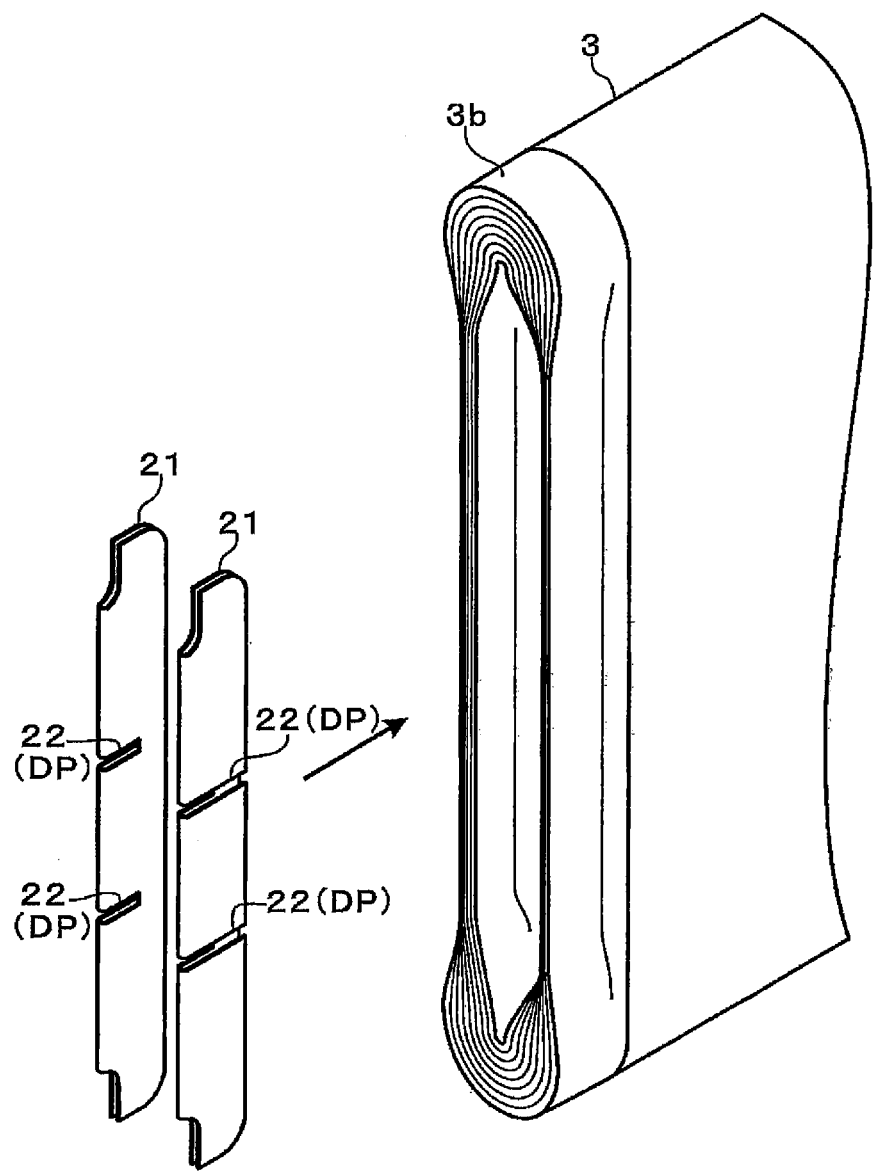
FIG. 7 is a perspective view showing the work of assembling an electric storage element according to the first embodiment of the present invention before the electric storage element is fitted with auxiliary plates.
Figure 8:
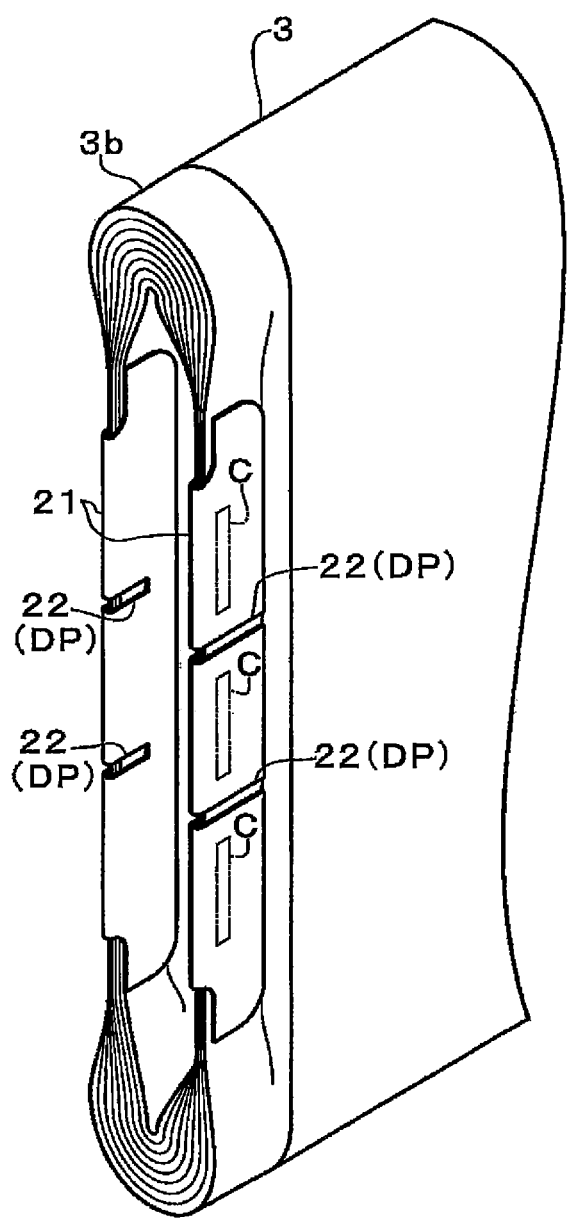
FIG. 8 is a perspective view showing the work of assembling the electric storage element according to the first embodiment of the present invention after the electric storage element is fitted with auxiliary plates.

A description will be made of a mode for attaching the auxiliary plates 21 to, for example, the negative electrode-side uncoated parts 3a and 3b. In the power generating element 3 wound into a flattened shape, the uncoated part 3b is unfolded into two bundles by applying a pushing, widening force to the flattened uncoated part from the center in the width direction to the left and right sides thereof, as shown in FIG. 7. Then, each of the two bundles is sandwiched with an auxiliary plate 21, as shown in FIG. 8. At this time, an end edge of the uncoated part 3b is placed against the inner side of the joining section 21c to position the auxiliary plate 21 in place, and the auxiliary plate 21 is attached to have the end edge of the uncoated part 3b abutting on the joining section 21c.

In addition, the two auxiliary plates 21 are crimped and firmly fixed on the uncoated part 3b. Consequently, the auxiliary plates 21 are solidly placed against welding surfaces of the uncoated part 3b which is a foil-shaped object to be welded. A surface of the first metal member 21a on the opposite side of a surface thereof in contact with the uncoated part 3b is a surface upon which ultrasonic vibration acts.

Also on the positive electrode side, two auxiliary plates 21 are attached to the uncoated part 3a in the same way as described above.

On the positive electrode side of a subassembly on the cover part 2 side, the metal plate 9 fitted on the rivet 8 is disposed with the threaded portion 5a of the terminal bolt 5 held in the retaining frame 10 penetrating through the metal plate 9. In addition, the rivet 8 is assembled in the cover part 2, while penetrating through the upper gasket 11, the cover part 2, the lower gasket 12 and the current collector 4, and is fixed by swaging the end portion of the rivet 8 on the inner side of the housing BC.

Also on the negative electrode side, the metal plate 16 fitted on the rivet 15 is disposed with the threaded portion 7a of the terminal bolt 7 held in the retaining frame 14 penetrating through the metal plate 16. In addition, the rivet 15 is assembled in the cover part 2, while penetrating through the upper gasket 17, the cover part 2, the lower gasket 18 and the current collector 6, and is fixed by swaging the end portion of the rivet 15 on the inner side of the housing BC.

Note that although the connecting portions 4a and 6a have already been formed in the current collectors 4 and 6 under this condition, the current collectors 4 and 6 do not have an L-shaped bent form. That is, locations of the current collectors 4 and 6 where the connecting portions 4a and 6a are formed (locations to serve as the above-mentioned vertically-positioned portions) also have a substantially linear shape extending along the longitudinal direction of the cover part 2.

Figure 9:
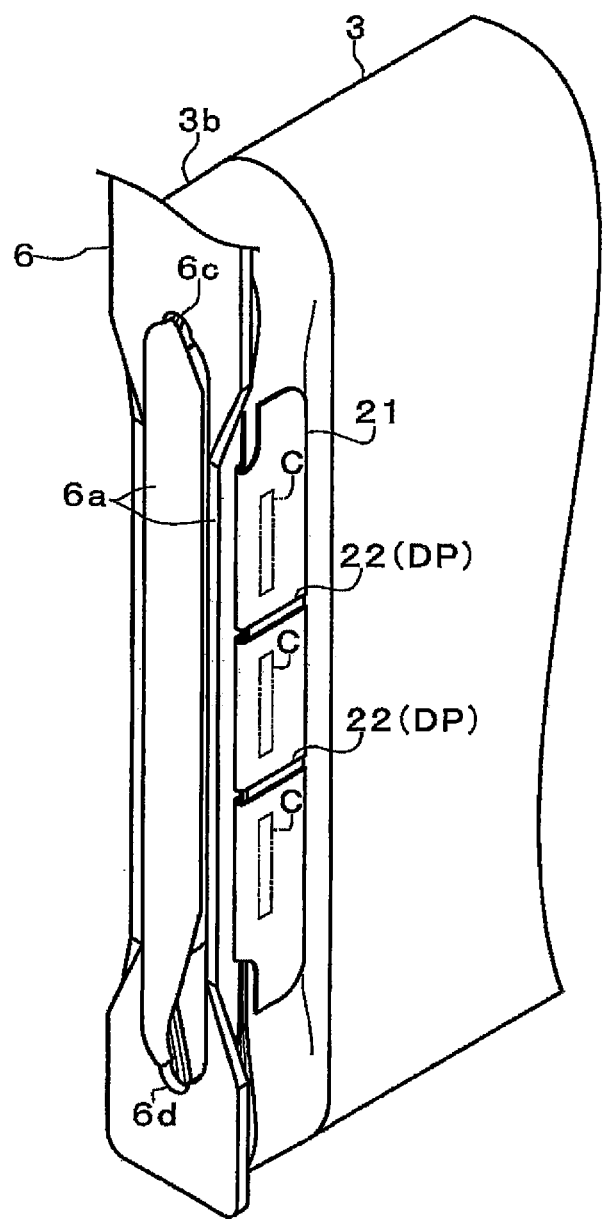
FIG. 9 is a perspective view showing the work of assembling the electric storage element according to the first embodiment of the present invention after the electric storage element is fitted with a current collector.

As described above, the power generating element 3 fitted with the auxiliary plates 21 is disposed immediately underneath a surface of the subassembly on the cover part 2 side on which the lower gaskets 12 and 18 are fitted. At this time, the power generating element 3 is disposed so that the winding axis of the foil-shaped electrode plate is parallel with the longitudinal direction of the cover part 2 and flat surfaces of the power generating element 3 are positioned orthogonally to the cover part 2. Next, the positive and negative current collectors 4 and 6 are bent into an L-shape, as shown in FIG. 2, and the connecting portions 4*a* and 6*a* are fitted into a space between the pair of auxiliary plates 21, as shown in FIG. 9. Note that although FIG. 9 shows only the negative electrode side correspondingly to, for example, FIG. 7, the positive electrode side is the same in layout as the negative electrode side.

Under the condition of the subassembly on the cover part 2 side and the power generating element 3 being assembled in this way, the uncoated parts 3*a* and 3*b* of the power generating element 3 and the connecting portions 4*a* and 6*a* of the current collectors 4 and 6 are joined by means of ultrasonic welding.

At the time of this ultrasonic welding, ultrasonic vibration is applied from the auxiliary plate 21 side to weld the auxiliary plates 21 into which the uncoated parts 3*a* and 3*b* are inserted and the connecting portions 4*a* and 6*a* of the current collectors 4 and 6, while placing the respective auxiliary plates 21 and the connecting portions 4*a* and 6*a* against each other.

Figure 6:
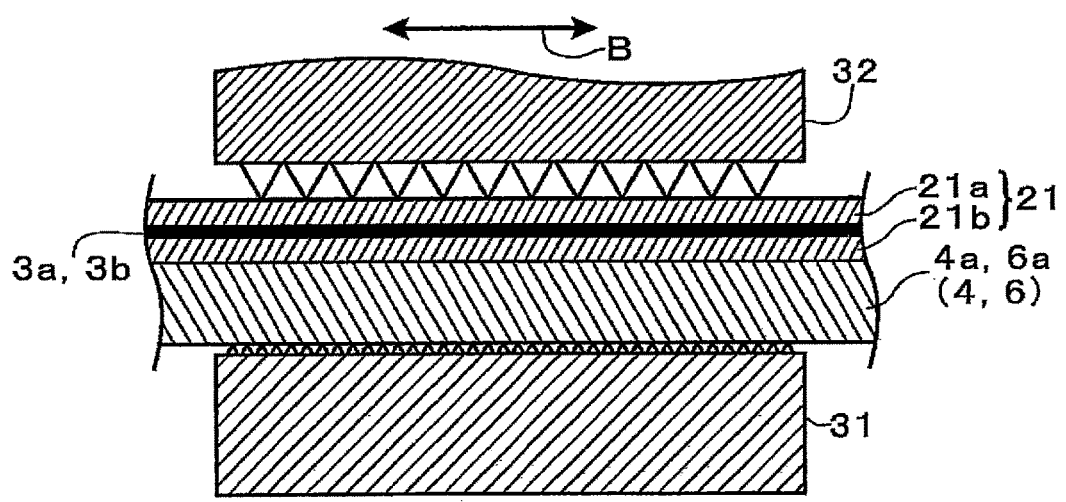
FIG. 6 is a cross-sectional view showing ultrasonic welding work according to the first embodiment of the present invention.

Specifically, as shown in FIG. 6 showing an approximate arrangement at the time of ultrasonic welding, an anvil 31 is placed against the current collectors 4 and 6, and the leading end portion 32 of the horn is placed against surfaces of the auxiliary plates 21 on the opposite side of surfaces thereof in contact with the current collectors 4 and 6 (front surface of the first metal member 21*a*). Then, ultrasonic vibration is applied along a direction (longitudinal direction of the uncoated parts 3*a* and 3*b*) shown by a double-headed arrow B in FIG. 6 with the uncoated parts 3*a* and 3*b* sandwiched between the auxiliary plates 21 and the current collectors 4 and 6.

That is, the auxiliary plates 21 and the current collectors 4 and 6 are joined, with the auxiliary plates and the current collectors placed in contact with each other, by applying ultrasonic vibration from a side surface (front surface of the first metal member 21*a*) positioned on a side surface of a pair of side surfaces of bend-formed auxiliary plates 21 on the opposite side of the surface on which the current collectors 4 and 6 are present.

A surface of the leading end portion 32 of the horn in contact with the auxiliary plates 21 has a thin, long rectangular shape extending in the direction shown by the double-headed arrow B in FIG. 6. The leading end portion 32 of the horn is placed against the auxiliary plates 21, while being positioned so that the longitudinal direction of the leading end portion 32 of the horn coincides with the longitudinal direction of the uncoated parts 3*a* and 3*b* of the flat surfaces of the power generating element 3. Sites of the auxiliary plates 21 on which ultrasonic vibration acts are shown by double-dot chain lines C in FIG. 4, FIG. 5 and FIG. 9. After ultrasonic welding, welding marks remain in places shown by the double-dot chain lines C.

A plurality of protrusions having an equilateral quadrangular pyramid shape is formed on the surface of the leading end portion 32 of the horn in contact with the auxiliary plates 21 and on the surface of the anvil 31 in contact with the current collectors 4 and 6, as schematically shown in FIG. 6. Each protrusion of the leading end portion 32 of the horn is larger than each protrusion on the anvil 31 side.

In FIG. 4 and FIG. 5, for example, sites of action of ultrasonic vibration shown by double-dot chain lines C are set in a plurality of places (three places in the present first embodiment) for each auxiliary plate 21.

Each auxiliary plate 21 includes a damping portion DP for blocking off the propagation of deformation ascribable to the action of ultrasonic vibration between sites of action of ultrasonic vibration (positions shown by double-dot chain lines C, in a strict sense, sites upon which ultrasonic vibration is to be caused to act).

Specifically, this damping portion DP is composed of a cutaway portion 22 formed by cutting away part of the first metal member 21*a* as shown in FIG. 4 and FIG. 5.

That is, the current collectors 4 and 6 and the auxiliary plates 21 are joined by setting sites of action of ultrasonic vibration, so that the cutaway portion 22 (damping portion DP) is positioned between adjacent sites of action of ultrasonic vibration.

The location of each cutaway portion 22 is set in the middle between adjacent sites of action of ultrasonic vibration. The cutaway portion 22 is formed by cutting a thin, long rectangular-shaped hole extending in a direction orthogonal to a direction in which sites of action of ultrasonic vibration in each auxiliary plate 21 line up, in a thin plate-shaped metal member, so as to penetrate from the front to back sides thereof.

One end in the lengthwise direction of the cutaway portion 22 extends up to an end edge of the auxiliary plate 21. In addition, the other end in the lengthwise direction of the cutaway portion 22 ends up at an intermediate position (intermediate position between end edges) of the auxiliary plate 21. That is, the cutaway portion 22 extends from the end edge of the auxiliary plate 21 to the intermediate position of the auxiliary plate 21. The auxiliary plate 21 retains a form of a single-piece member as the result of this cutaway portion 22 being formed into a shape extending from the end edge to the intermediate position of the thin plate-shaped metal member.

The end portion of the cutaway portion 22 on the other end side thereof extends beyond the center line A. As shown in FIG. 5, the cutaway portion 22 is cut out so that a cutout ranges from the end edge of the first metal member 21*a* to the location where the joining section 21*c* is formed and further extends up to the second metal member 21*b*. The cutaway portion 22 is thus formed. Consequently, under the condition of the auxiliary plate 21 being double-folded, the cutaway portion 22 shows up at the top of the back of the double-folded auxiliary plate.

In the ultrasonic welding of the current collectors 4 and 6 and the uncoated parts 3*a* and 3*b*, respective sites of action of ultrasonic welding in each auxiliary plate 21 are welded in order in the configuration of FIG. 6.

At the time of this ultrasonic welding, ultrasonic vibration propagates circumferentially from each site of action of ultrasonic welding, thus causing the auxiliary plate 21 to become slightly deformed around the site. The propagation of the ultrasonic vibration and deformation is blocked off, however, at a location where the cutaway portion 22 is formed.

Accordingly, it is possible to prevent deformations arising from both sides between adjacent sites of action of ultrasonic vibration from becoming superimposed on each other at a midway location between the two sites of action and producing cracks or the like in the auxiliary plate 21.

In the present first embodiment, a direction in which ultrasonic vibration is applied (direction shown by a double-headed arrow B) coincides with a direction in which sites of action of ultrasonic vibration in the auxiliary plate 21 line up. Accordingly, the amount of deformation propagation in the direction in which sites of action of ultrasonic vibration line up is large. It is therefore particularly effective to form the cutaway portion 22 between adjacent sites of action of ultrasonic vibration.

When the ultrasonic welding of two auxiliary plates 21 is completed in each of the positive electrode side and the negative electrode side, the power generating element 3 is assembled. Subsequently, this cover part 2 side subassembly is inserted in a can body 1, and the end edge of the cover part 2 and the open end of the can body 1 are laser-welded.

After being made to go through the processes of injecting an electrolytic solution, initial charging, and the like, the secondary battery cell RB is brought to completion.

<Second Embodiment>

Next, a description will be made of a second embodiment in which the present invention is applied to an electric storage apparatus. Note that the same reference numerals and characters are used for constituent elements corresponding to those of the first embodiment.

The present second embodiment differs from the first embodiment only in the shape of auxiliary plates 21 for ultrasonic welding. Other constituent elements of the present second embodiment and a method for manufacturing the secondary battery cell RB which is an electric storage apparatus of the present second embodiment are common to the first embodiment.

An auxiliary plate 21 of the present second embodiment is common to the auxiliary plate 21 of the first embodiment in that both auxiliary plates 21 include a first metal member 21a upon which ultrasonic vibration is caused to act at the time of ultrasonic welding, a second metal member 21b disposed on the opposite side of the first metal member across a space where uncoated parts 3a and 3b are present, and a joining section 21c for coupling end edges of the first metal member 21a and the second metal member 21b with each other. The auxiliary plate 21 of the present second embodiment is also common to the auxiliary plate 21 of the first embodiment in that both auxiliary plates 21 are formed by bend-forming a thin plate-shaped metal member. The first embodiment and the present second embodiment differ, however, in the structure of the damping portion DP. Specifically, the difference is as follows. In the first embodiment, the cutaway portion 22 formed in the thin plate-shaped metal member constitutes the damping portion DP for blocking off the propagation of deformation due to the action of ultrasonic vibration. In contrast, in the present second embodiment, a thick-walled portion 25 formed by partially increasing the plate thickness of the first metal member 21a constitutes the damping portion DP instead of the cutaway portion 22, as shown in FIG. 10 and FIG. 11.

Figure 10:
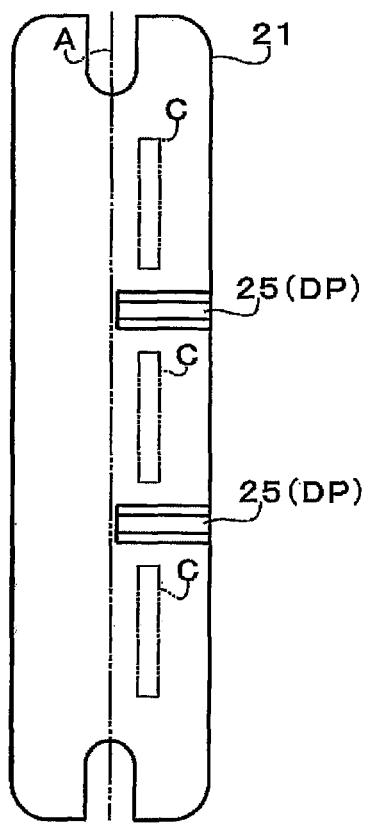
FIG. 10 is an enlarged view of an auxiliary plate for ultrasonic welding according to a second embodiment of the present invention in an unfolded state.
Figure 11:
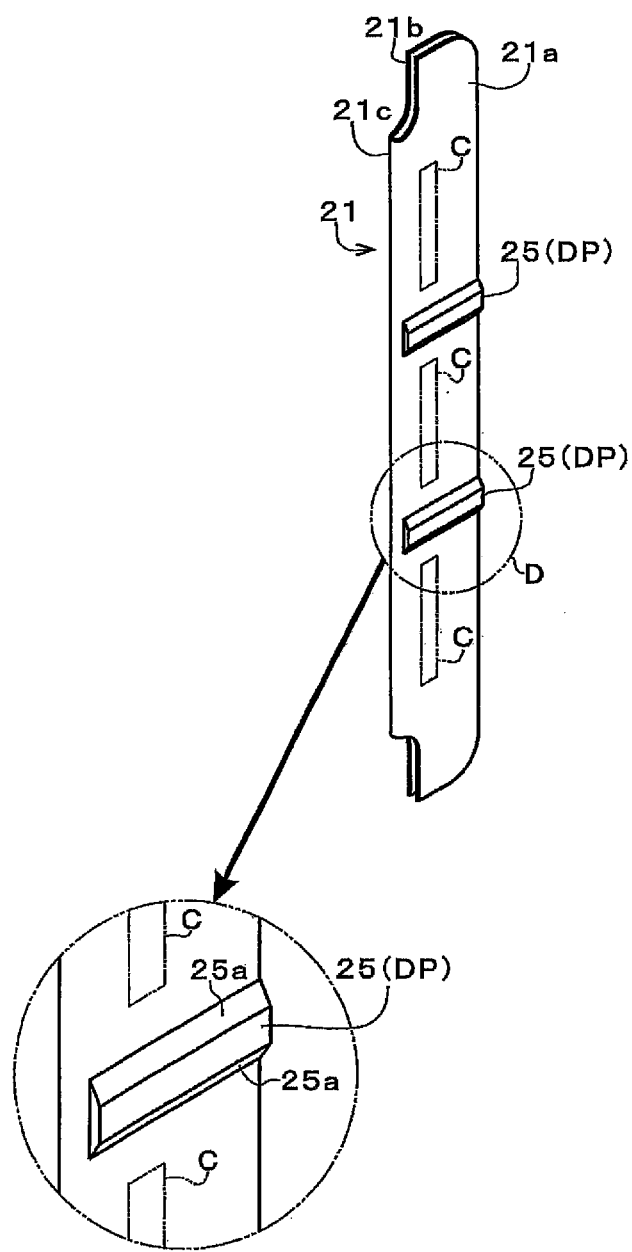
FIG. 11 is an enlarged perspective view and a partially-enlarged view of the auxiliary plate for ultrasonic welding according to the second embodiment of the present invention.

Even if the damping portion DP has the shape shown in FIG. 10 and FIG. 11, there is obtained the same effect that the auxiliary plate 21 of the first embodiment has. That is, the thick-walled portion 25 which is the damping portion DP blocks off the propagation of deformation due to the action of ultrasonic vibration at the time of the ultrasonic welding of the uncoated parts 3a and 3b.

FIG. 10 and FIG. 11 correspond to FIG. 4 and FIG. 5 in the first embodiment. FIG. 10 presents an unfolded view of a thin plate-shaped metal member taken in the normal-line direction thereof, whereas FIG. 11 presents a perspective view of the metal member bend-formed by double-folding the member on the center line A of FIG. 10.

As described above, the auxiliary plate 21 shown in FIG. 10 and FIG. 11 is used in the same mode as the auxiliary plate 21 having the shapes shown in FIG. 4 and FIG. 5 in the first embodiment. In addition, sites of action of ultrasonic vibration shown by double-dot chain lines C, the mode of welding, and the like are also common to the auxiliary plate 21 of the first embodiment.

In the auxiliary plate 21 shown in FIG. 10 and FIG. 11, the thick-walled portions 25 are formed in the locations where the cutaway portions 22 are formed in the first embodiment. Also in the auxiliary plate 21 shown in FIG. 10 and FIG. 11, sites of action of ultrasonic vibration are set so that each thick-walled portion 25 is positioned between adjacent sites of action of ultrasonic vibration. The thick-walled portions 25 differ in the range of formation from the cutaway portions 22 of the first embodiment.

Each thick-walled portion 25 (damping portion DP) extends from an end edge of the first metal member 21a toward the joining section 21c side. The thick-walled portion 25 is formed within a range from the end edge of the first metal member 21a up to the position of a boundary of the first metal member 21a with the joining section 21c.

The thick-walled portion 25 is formed in the middle between adjacent sites of action of ultrasonic vibration. This thick-walled portion 25 is formed as a thin, long rectangular step extending in a direction orthogonal to a direction in which sites of action of ultrasonic vibration in the auxiliary plate 21 line up.

In this step of the thick-walled portion 25, inclined surfaces 25a are formed on both sides of a site of action of ultrasonic vibration, as shown in an enlarged view of an area enclosed by a double-dot chain line D in FIG. 11. A boundary between the thick-walled portion 25 and a thin-walled portion surrounding the thick-walled portion is formed so that the thickness of the thin plate-shaped metal member (first metal member 21a) gradually varies along a virtual line connecting adjacent sites of action of ultrasonic vibration.

Note that a surface of the auxiliary plate 21 where the thick-walled portions 25 are formed and a surface on the opposite side of the surface are flat.

<Third Embodiment>

Next, a description will be made of a third embodiment in which the present invention is applied to an electric storage apparatus. Note that the same reference numerals and characters are used for constituent elements corresponding to those of the first embodiment.

The present third embodiment also differs from the first embodiment only in the shape of auxiliary plates 21 for ultrasonic welding. Other constituent elements of the present third embodiment and a method for manufacturing the secondary battery cell RB which is an electric storage apparatus of the present third embodiment are common to the first embodiment.

An auxiliary plate 21 of the present third embodiment is common to the first embodiment in that both auxiliary plates 21 include a first metal member 21a upon which ultrasonic vibration is caused to act at the time of ultrasonic welding, a second metal member 21b disposed on the opposite side of the first metal member across a space where uncoated parts 3a and 3b are present, and a joining section 21c for coupling end edges of the first metal member 21a and the second metal member 21b with each other. The auxiliary plate 21 of the present third embodiment is also common to the auxiliary plate 21 of the first embodiment in that both auxiliary plates 21 are formed by bend-forming a thin plate-shaped metal member. The first embodiment and the present third embodiment differ, however, in the structure of the damping portion DP. Specifically, the difference is as follows. In the first embodiment, the cutaway portion 22 formed in the thin plate-shaped metal member constitutes the damping portion DP for blocking off the propagation of deformation due to the action of ultrasonic vibration. In contrast, in the present third embodiment, a convex ridge portion 26 formed by bending the first metal member 21*a* into a convex ridge shape by means of pressing or the like constitutes the damping portion DP instead of the cutaway portion 22, as shown in FIG. 12 and FIG. 13.

Figure 12:
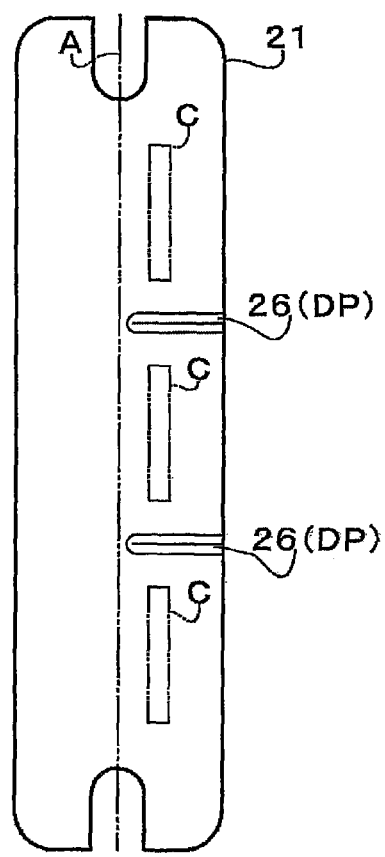
FIG. 12 is an enlarged view of an auxiliary plate for ultrasonic welding according to a third embodiment of the present invention in an unfolded state.
Figure 13:
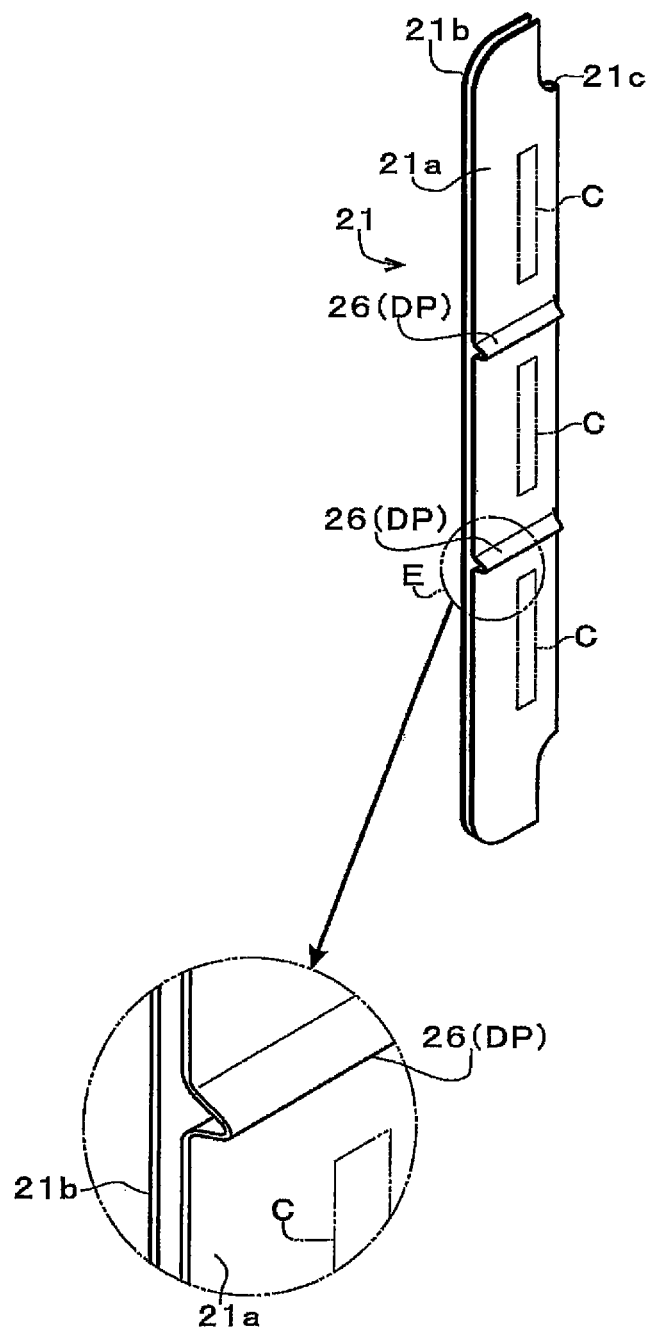
FIG. 13 is an enlarged perspective view and a partially-enlarged perspective view of the auxiliary plate for ultrasonic welding according to the third embodiment of the present invention.

FIG. 12 and FIG. 13 correspond to FIG. 4 and FIG. 5 in the first embodiment. FIG. 12 presents an unfolded view of a thin plate-shaped metal member taken in the normal-line direction thereof, whereas FIG. 13 presents a perspective view of the metal member bend-formed by double-folding the member on the center line A of FIG. 12. FIG. 13 also presents an enlarged view of an area enclosed by a double-dot chain line E in the FIG. 13. Note that whereas FIG. 5 is a perspective view taken from the joining section 21*c* side, FIG. 13 is a perspective view taken from the end edge sides of the first metal member 21*a* and the second metal member 21*b* on the opposite side of the joining section 21*c*.

FIG. 12 and FIG. 13 show a case, by way of example, where the convex ridge portion 26 is bend-formed on a surface upon which ultrasonic vibration acts, so that the cross-sectional shape of the convex ridge portion in lengthwise view is a convex, substantially V-shape. The specific bent form of the convex ridge portion 26 may be varied as appropriate, however. For example, the cross-sectional shape of the convex ridge portion 26 may be bend or curve-formed into a substantial U-shape. In addition, the convex ridge portion 26 may be formed into a shape having a corrugated cross section in which a plurality of convex ridges is laid out.

The convex ridge portion 26 extends in a direction intersecting with (more specifically, intersecting at right angles with) a line connecting adjacent sites of action of ultrasonic vibration (locations shown by double-dot chain lines C in FIG. 12 and FIG. 13) in the middle point of the line.

The convex ridge portion 26 (damping portion DP) extends from an end edge of the first metal member 21*a* toward the joining section 21*c* side. The range of formation of this convex ridge portion 26 is from an end portion of the first metal member 21*a* to the position of a boundary of the first metal member 21*a* with the joining section 21*c*.

The auxiliary plate 21 shown in FIG. 12 is used in the same mode as the auxiliary plate 21 having the shape shown in FIG. 4 in the above-described embodiment. In addition, the sites of action of ultrasonic vibration shown by double-dot chain lines C in FIG. 12 and FIG. 13 are also the same as the sites of action shown in FIG. 4 and FIG. 5.

Figure 14:
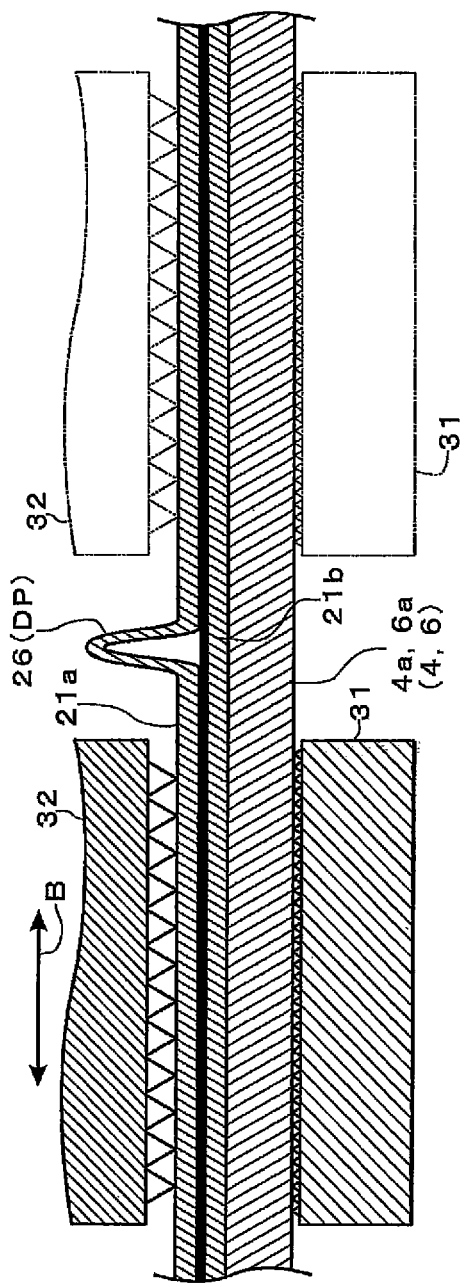
FIG. 14 is a cross-sectional view showing ultrasonic welding work according to the third embodiment of the present invention.

As shown in FIG. 14 showing an approximate arrangement at the time of ultrasonic welding in the same cross-sectional view as that of FIG. 6 in the first embodiment, the connecting portions 4*a* and 6*a* of the current collectors 4 and 6 are placed against the first metal member 21*a* and the second metal member 21*b* sandwiching the uncoated parts 3*a* and 3*b*. Then, an anvil 31 is disposed on the side of the current collectors 4 and 6, the leading end portion 32 of a horn is placed on the first metal member 21*a* side on which the convex ridge portions 26 are formed, and ultrasonic vibration is caused to act from the first metal member 21*a* side.

At this time, the deformation of the first metal member 21*a* due to the application of ultrasonic vibration propagates to the locations where the convex ridge portions 26 are formed, when ultrasonic vibration is applied along a direction shown by a double-headed arrow B in FIG. 14. The deformation is absorbed by the convex ridge portions 26, however. Consequently, the propagation of deformation beyond the locations where the convex ridge portions 26 are formed is suppressed sufficiently.

Next, when the leading end portion 32 of the horn and the anvil 31 are moved to positions shown by double-dot chain lines to cause ultrasonic vibration to act at an adjacent site of action, the deformation of the first metal member 21*a* due to the application of ultrasonic vibration propagates to the locations where the convex ridge portions 26 are formed. The deformation is absorbed by the convex ridge portions 26, however. The propagation of deformation beyond the locations where the convex ridge portions 26 are formed is thus suppressed sufficiently.

As a result, it is possible to avoid such a situation in which deformations arising from adjacent sites of action of ultrasonic vibration become superimposed on each other to grow to a large-scale deformation. As described above, it is possible to obtain the same advantageous effect as that of the auxiliary plate 21 of the first embodiment even if the auxiliary plate 21 is formed into the shapes shown in FIG. 12 and FIG. 13.

<Other Embodiments>

Hereinafter, other embodiments of the present invention will be enumerated. Note that the same reference numerals and characters are used for constituent elements corresponding to those of the first embodiment.

(1) In each of the above-described embodiments, a case is cited where the uncoated parts 3*a* and 3*b* are sandwiched with the auxiliary plates 21 for ultrasonic welding in which end edges of the first metal member 21*a* and the second metal member 21*b* are coupled with each other by the joining section 21*c*, the sandwiched components are overlapped with the connecting portions 4*a* and 6*a* of the current collectors 4 and 6, and the overlapped components are collectively ultrasonic-welded. The ultrasonic welding of the uncoated parts 3*a* and 3*b* and the like and the joining of the current collectors 4 and 6 may be performed at separate points of time, however.

Figure 15:
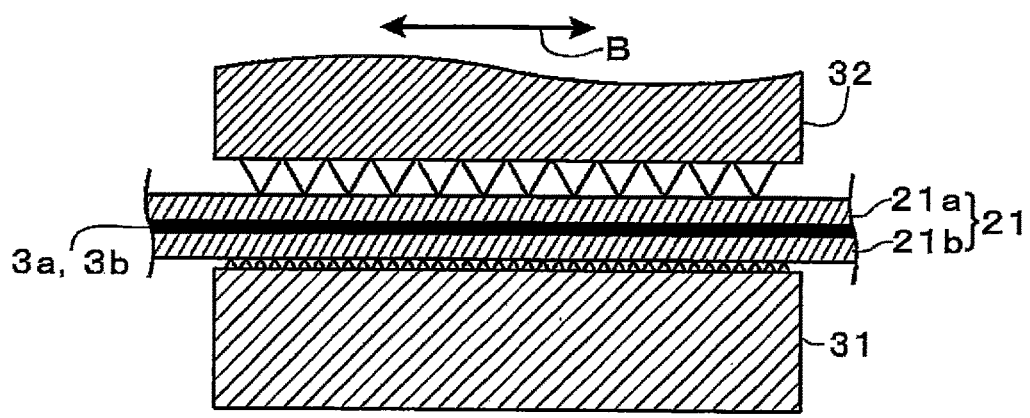
FIG. 15 is a cross-sectional view showing ultrasonic welding work according to another embodiment of the present invention.

For example, the above-described method is as follows. As shown in the cross-sectional view of FIG. 15 corresponding to FIG. 6 in the first embodiment, a subassembly in which the uncoated parts 3*a* and 3*b* are sandwiched with the auxiliary plates 21 for ultrasonic welding shown in the first to third embodiments and crimped, i.e., a subassembly in which the uncoated parts 3*a* and 3*b* are simply sandwiched with the first metal member 21*a* and the second metal member 21*b* constituting each auxiliary plate 21 is disposed between the leading end portion 32 of the horn and the anvil 31. Under this condition, ultrasonic welding may be performed by causing ultrasonic vibration to act upon positions shown by double-dot chain lines C in, for example, FIG. 4.

In this case, the auxiliary plates 21 are not limited to a structure in which the first metal member 21*a* and the second metal member 21*b* are coupled by the joining section 21*c*. The first metal member 21*a* upon which ultrasonic vibration is caused to act and the second metal member 21*b* positioned on the opposite side of the first metal member 21*a* across the uncoated parts 3*a* and 3*b* may be separate components.

The components welded in this way and the connecting portions 4a and 6a of the current collectors 4 and 6 may be joined by, for example, resistance-welding the auxiliary plates 21 and the connecting portions 4a and 6a of the current collectors 4 and 6.

Figure 16:
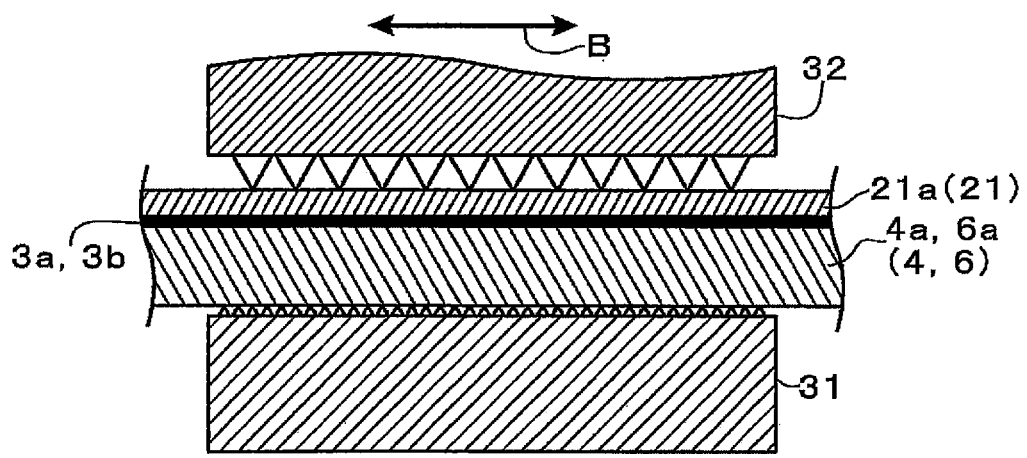
FIG. 16 is a cross-sectional view showing ultrasonic welding work according to yet another embodiment of the present invention.

(2) In each of the above-described embodiments, a case is cited where each auxiliary plate 21 formed from a thin plate-shaped metal member is double-folded, end edges of the first metal member 21a and the second metal member 21b are coupled with each other by the joining section 21c, and the uncoated parts 3a and 3b are sandwiched with the auxiliary plates 21. As shown in the cross-sectional view of FIG. 16 corresponding to FIG. 6 in the first embodiment, however, ultrasonic vibration may be caused to act upon a subassembly in which the bundled portions of the uncoated parts 3a and 3b sandwiched between the auxiliary plates 21 formed as substantially flat plate materials and the current collectors 4 and 6 from the auxiliary plate 21 side, thereby ultrasonic-welding the auxiliary plates 21 and the current collectors 4 and 6.

In this case, each auxiliary plate 21 is composed only of the first metal member 21a. In addition, the current collectors 4 and 6 serve as the second metal member for sandwiching the uncoated parts 3a and 3b along with the first metal member 21a.

The structure of damping portions DP formed in the auxiliary plate 21 which is the first metal member 21a may be the same as the structure in the first to third embodiments.

Figure 17:
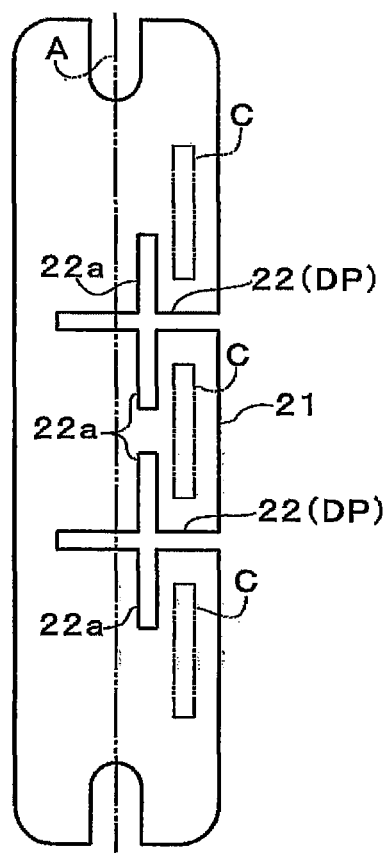
FIG. 17 is an enlarged view of an auxiliary plate for ultrasonic welding according to another embodiment of the present invention in an unfolded state.
Figure 18:
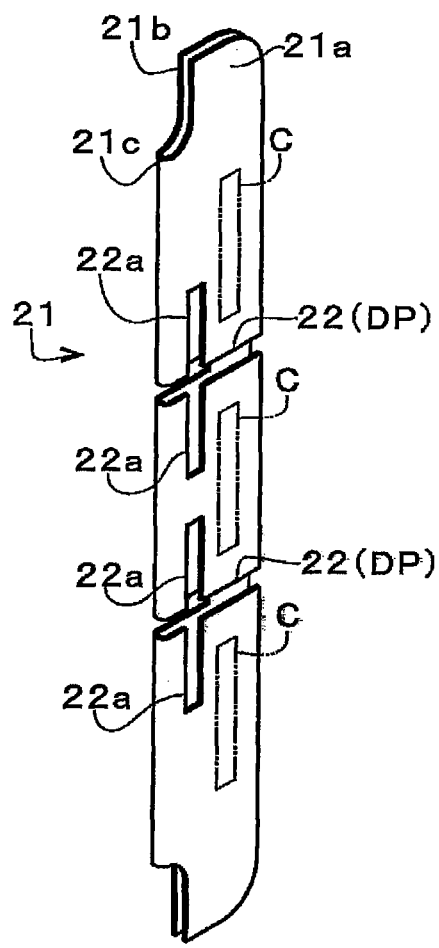
FIG. 18 is an enlarged perspective view of the auxiliary plate for ultrasonic welding according to another embodiment of the present invention.

(3) In the first embodiment, each cutaway portion 22 formed as a damping portion DP in each auxiliary plate 21 for ultrasonic welding is formed by cutting away a portion of the first metal member 21a into a single linear shape from an end edge thereof toward the second metal member 21b side, as shown in FIG. 4 and FIG. 5. Alternatively, however, each cutaway portion 22 may have a shape including a lateral extending portion 22a cut so as to branch and extend from a midway location of the cutaway portion 22 of the first metal member 21a toward sites of action of ultrasonic welding (locations shown by double-dot chain lines C) on both sides of the midway location, as shown in FIG. 17 and FIG. 18 showing auxiliary plates 21 correspondingly to FIG. 4 and FIG. 5.

According to such a configuration as described above, the cutaway portions 22 including the lateral extending portion 22a are laid out so as to surround an end portion of each site of action of ultrasonic vibration. Consequently, it is possible to more effectively block off the propagation of deformation in the first metal member spreading circumferentially from each site of action of ultrasonic vibration.

Having thus described a case where cutaway portions 22 are formed as damping portions DP, the same holds true for the thick-walled portions 25 in the second embodiment and the convex ridge portions 26 in the third embodiment. That is, it is possible to more effectively block off the propagation of deformation in the first metal member spreading circumferentially from each site of action of ultrasonic vibration by forming the same lateral extending portions as the above-mentioned lateral extending portions 22a also in the thick-walled portions 25 and the convex ridge portions 26 and disposing the lateral extending portions so as to surround an end portion of each site of action of ultrasonic vibration.

(4) In each of the above-described embodiments, auxiliary plates 21 in which damping portions DP composed of cutaway portions 22, thick-walled portions 25 or convex ridge portions 26 are formed are used on both the positive electrode side and the negative electrode side. The damping portions DP may be formed only in the negative electrode-side auxiliary plate 21, however, which is liable to crack due to the use of copper as a material.

(5) In each of the above-described embodiments, sites of action of ultrasonic vibration are set in three places for one auxiliary plate 21 for ultrasonic welding. Alternatively, however, the sites of action may be set in two places or four or more places.

(6) In each of the above-described embodiments, a non-aqueous electrolyte secondary battery cell RB is cited as an example of an electric storage apparatus to which the present invention is applied. The present invention is also applicable to various types of electric storage apparatuses, however, including capacitors.

(7) In each of the above-described embodiments, a winding-type electric storage element 3 is cited as an example in which a long belt-shaped positive electrode-side electrode plate and a long belt-shaped negative electrode-side electrode plate are wound with a separator held therebetween. The present invention is applicable to any electric storage apparatuses, however, as long as the electric storage apparatuses are provided with an electric storage element in which a positive electrode-side electrode plate and a negative electrode-side electrode plate are stacked in a layered manner. For example, the present invention is also applicable to a stacked electric storage element in which a plurality of positive electrode-side electrode plates and a plurality of negative electrode-side electrode plates are alternately stacked with separators held thereamong. As another example, an electric storage element may have a configuration in which a positive electrode-side electrode plate, a negative electrode-side electrode plate, and a separator are stacked in a layered manner with at least one of these components accordion-folded.

REFERENCE SIGNS LIST

3 Electric storage element
4, 6 Current collector
5, 7 Electrode terminal
22 Cutaway portion
25 Thick-walled portion
26 Convex ridge portion
DP Damping portion

The invention claimed is:

1. A method for manufacturing an electric storage apparatus, the method comprising:
   sandwiching a metal foil, extending outward from electrode plates stacked in a layered manner, between a first metal member provided with a damping portion and a second metal member; and
   causing ultrasonic vibration to act upon a plurality of sites of action from a side of the first metal member to join the metal foil to the first metal member and the second metal member by directly placing a horn against the first metal member,
   wherein in joining the metal foil to the first and second metal members, each site of action is set to have the damping portion located between adjacent sites of action of the ultrasonic vibration, and
   wherein the damping portion includes at least one of a cutaway portion formed by cutting away a part of the first metal member, a thick-walled portion formed by partially increasing a plate thickness of the first metal member, and a convex ridge portion formed by bending a part of the first metal member into a convex ridge shape.

2. The method for manufacturing an electric storage apparatus according to claim 1, wherein the damping portion includes the cutaway portion, and wherein the cutaway portion extends from an end edge of the first metal member.

3. The method for manufacturing an electric storage apparatus according to claim 1, wherein the damping portion includes the thick-walled portion, and wherein, in the first metal member, a thickness of the boundary between the thick-walled portion and a thin-walled portion surrounding the thick-walled portion varies gradually.

4. The method for manufacturing an electric storage apparatus according to claim 1, wherein the damping portion includes the convex ridge portion, and wherein the convex ridge portion extends in a direction intersecting with a line connecting the adjacent sites of action of the ultrasonic vibration.

5. The method for manufacturing an electric storage apparatus according to claim 1, wherein end edges of the first metal member and the second metal member are coupled with each other at a joining section, and wherein the cutaway portion is formed by cutting away a range of the first metal member from an end edge thereof up to at least the joining section.

6. The method for manufacturing an electric storage apparatus according to claim 1, wherein end edges of the first metal member and the second metal member are coupled with each other at a joining section, and wherein in the sandwiching the metal foil, the metal foil is sandwiched between the first metal member and the second metal member to have an end edge of the metal foil abutting on the joining section.

7. The method for manufacturing an electric storage apparatus according to claim 6, wherein the damping portion extends within a range from an end edge of the first metal member up to a position of a boundary of the first metal member with the joining section.

8. The method for manufacturing an electric storage apparatus according to claim 1, wherein the damping portion extends so as to surround a part of said each site of action.

9. An auxiliary plate for ultrasonic welding, the auxiliary plate comprising:

a metal member including a contact-making surface to be placed against a welding surface of a foil-shaped object to be welded; and an acting surface upon which ultrasonic vibration is caused to act and which is located on an opposite side of the contact-making surface, the auxiliary plate comprising a damping portion including a convex ridge portion formed by bending a part of the metal member into a convex ridge shape, wherein, in the metal member, the convex ridge portion protrudes from the metal member in an opposite direction from a direction that the contact-making surface and the welding surface sandwich the foil-shaped object.

10. The auxiliary plate for ultrasonic welding according to claim 9, wherein the damping portion includes a thick-walled portion formed by partially increasing a plate thickness of the metal member, and wherein, in the metal member, a thickness of a boundary between the thick-walled portion and a thin-walled portion surrounding the thick-walled portion varies gradually.

11. The auxiliary plate for ultrasonic welding according to claim 9, wherein the damping portion extends so as to surround a part of a site of action of the ultrasonic vibration.

12. An electric storage apparatus comprising an electric storage element, including:

an electrode assembly configured by stacking electrode plates, on one edge side of each of which a metal foil extends outward, in a layered manner; and the auxiliary plate for ultrasonic welding according to claim 9 including a plurality of sites of action upon which the ultrasonic vibration is caused to act and placed against the metal foil, wherein, in the auxiliary plate, the damping portion is formed between adjacent ones of the sites of action.

13. The method for manufacturing an electric storage apparatus according to claim 1, wherein said each site of action longitudinally extends in a longitudinal direction of an extension of the first metal member.

14. The method for manufacturing an electric storage apparatus according to claim 1, wherein an entirety of the first metal member is exposed to the metal foil.

15. The method for manufacturing an electric storage apparatus according to claim 1, wherein the causing ultrasonic vibration to act includes causing the ultrasonic vibration to act upon said each site of action.

16. The method for manufacturing an electric storage apparatus according to claim 1, wherein the damping portion includes the convex ridge portion, and wherein the convex ridge portion protrudes from the first metal member in an opposite direction from a direction that the first meal member and the second metal member sandwich the metal foil.

17. The auxiliary plate for ultrasonic welding according to claim 9, wherein an entirety of the metal member is exposed to the foil-shaped object.

18. The auxiliary plate for ultrasonic welding according to claim 9, wherein the damping portion further includes a thick-walled portion formed by partially increasing a plate thickness of the metal member, and wherein, in the metal member, the thick-walled portion protrudes from the metal member in the opposite direction from the direction that the contact-making surface and the welding surface sandwich the foil-shaped object.

* * * * *

UNITED STATES PATENT AND TRADEMARK OFFICE
CERTIFICATE OF CORRECTION

PATENT NO. : 10,050,299 B2
APPLICATION NO. : 14/418889
DATED : August 14, 2018
INVENTOR(S) : Satoshi Murakami et al.

Page 1 of 1

It is certified that error appears in the above-identified patent and that said Letters Patent is hereby corrected as shown below:

On the Title Page

(72) Inventors should read:
Satoshi Murakami, Kyoto (JP);
Shinsuke Yoshitake, Kyoto (JP);
Tomonori Kishimoto, Kyoto (JP)

Signed and Sealed this
Thirtieth Day of October, 2018

Andrei Iancu
*Director of the United States Patent and Trademark Office*